(12) United States Patent
Kajiyama et al.

(10) Patent No.: US 6,590,842 B1
(45) Date of Patent: Jul. 8, 2003

(54) RECORDING AND/OR REPRODUCING APPARATUS FOR DISKLIKE RECORDING MEDIUM

(75) Inventors: Yoshihiro Kajiyama, Saitama (JP); Akihisa Inatani, Kanagawa (JP); Shizuo Ohishi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/700,481

(22) PCT Filed: Apr. 6, 2000

(86) PCT No.: PCT/JP00/02206

§ 371 (c)(1), (2), (4) Date: Nov. 15, 2000

(87) PCT Pub. No.: WO00/60587

PCT Pub. Date: Oct. 12, 2000

(30) Foreign Application Priority Data

Apr. 6, 1999 (JP) .................................. 11-099417

(51) Int. Cl.[7] ............................................. G11B 17/24
(52) U.S. Cl. .................................. 369/30.86; 369/30.56; 369/37.01
(58) Field of Search .............................. 369/37, 30.56, 369/30.79, 30.85, 30.86, 37.01

(56) References Cited

U.S. PATENT DOCUMENTS

| | | | | |
|---|---|---|---|---|
| 5,719,725 A | * | 2/1998 | Nakao | 360/98.06 |
| 5,777,958 A | * | 7/1998 | Matumoto et al. | 369/30.79 |
| 5,828,633 A | * | 10/1998 | Inatani et al. | 369/185 |
| 5,870,359 A | * | 2/1999 | Furusawa et al. | 369/30.77 |
| 5,970,041 A | * | 10/1999 | Inatani et al. | 369/75.1 |
| 6,169,713 B1 | * | 1/2001 | Silverstein | 369/30.79 |
| 6,212,139 B1 | * | 4/2001 | Nakamura et al. | 369/30.85 |

FOREIGN PATENT DOCUMENTS

| | | | |
|---|---|---|---|
| JP | 60-3954 | 1/1985 | G11B/17/22 |
| JP | 61-111057 | 7/1986 | G11B/17/24 |
| JP | 3-94657 | 9/1991 | G11B/17/28 |
| JP | 11-53807 | 2/1999 | G11B/17/24 |

* cited by examiner

Primary Examiner—William Korzuch
Assistant Examiner—Jennifer M Dolan
(74) Attorney, Agent, or Firm—Oblon, Spivak, McClelland, Maier & Neustadt, P.C.

(57) ABSTRACT

A recording and/or playback apparatus of a dislike recording medium, such as optical disk, is equipped with a receiving portion, a recording and/or playback portion, an ejecting operation mechanism, a loading mechanism, and a positioning mechanism. In the receiving portion, a plurality of supporting portions supporting respective peripheral ends of a plurality of disklike recording media are formed in an annular form, and an opening portion is formed on the supporting portion. The recording and/or playback portion conducts recording and/or playback of the disklike recording media. The ejecting operation mechanism penetrates from the opening portion of the receiving portion and ejects a desired disklike recording medium out of the disklike recording media, from the supporting portion. The loading mechanism takes out the desired disklike recording medium, which has been ejected from the supporting portion by the ejecting operation mechanism, from the receiving portion and loads the desired disklike recording medium onto the recording and/or playback portion. The positioning mechanism rotates the receiving portion and makes the desired disklike recording medium and the loading mechanism oppose to each other.

12 Claims, 34 Drawing Sheets

RECORDING AND/OR REPRODUCING APPARATUS FOR DISKLIKE RECORDING MEDIUM

TECHNICAL FIELD

The present invention relates to a recording and/or playback apparatus of a disklike recording medium. In particular, it relates to a recording and/or playback apparatus for taking one disklike recording medium out of a plurality of disklike recording media and then conducting a playback of information signals, such as musical sound signals and the like, recorded on the taken-out disklike recording medium or for conducing a recording of information signals, such as musical sound signals and the like, on a disklike recording medium

BACKGROUND TECHNIQUE

A recording and/or playback apparatus using a disklike optical recording medium (hereinafter simply optical disk), which is shown in FIG. 1, is known.

A recording and/or playback apparatus 1 is equipped with a disk receiving portion 2, in which a large number of optical disk supporting portions 22 . . . 22 are arranged, and one end portion of an optical disk 201 is one-side supported on these supporting portions 22 . . . 22, a loading portion 6 for taking out the optical disk 201 in the supporting portion of a desired address in first to nth addresses of the optical disk receiving portion 2, a conveyance mechanism 3 for adjusting the optical disk 201 in the supporting portion of a desired address to the position of the loading portion 6, a locking mechanism 4 for locking the position of the optical disk receiving portion 2 and the loading mechanism 6, which have been aligned, and a recording and/or playback portion 8 for conducing a recording and/or playback of the optical disk 201 loaded by the loading mechanism 6.

The optical disk receiving portion 2 is provided with the optical disk supporting portions 22 . . . 22 in the form of groove in a radial direction of an upper surface of a rotating table 21 that rotates about a shaft 23. Lower end portions of optical disks 201 are brought into engagement with the optical disk supporting portions 22 . . . 22 in the form of groove. With this, these optical disks 201 . . . 201 are one-side supported by the rotating table 21 under a condition that they are stood substantially upright. The rotating table 21 is driven to rotate by the conveyance mechanism 3, and thereby the optical disk 201 of a desired address is moved to the position of the loading mechanism 6.

The loading mechanism 6 is arranged outside of the rotating table 21, takes it out of the supporting portion 22 in the form of groove by clamping, with a pair of arms, a periphery of the optical disk 201 of a desired address out of the first to nth addresses of the rotating table 21 locked by the locking mechanism 4, and moves the optical disk 201 to the loading position at which it is subjected to a chucking at the recording and/or playback portion 8.

The conveyance mechanism 3 is equipped with a gear 41 meshing with gear teeth 31 . . . 31 formed on an peripheral portion of the rotating table 21, and the rotating table 21 is driven by rotating the gear 41 with a motor 44.

The locking mechanism 4 has a table engaging portion 51, which engages with the gear teeth 31 . . . 31 formed on the peripheral portion of the rotating table 21, and locks the rotating table 21 unrotatably by bringing the table engaging portion 51 into engagement with the gear teeth 31 . . . 31.

The recording and/or playback portion 8 is equipped with a first flame portion 143 for rotation/signal detection, which is equipped with a disk table 141, an optical pickup device 142 and the like, and a second frame portion 145 for chucking, which is equipped with a damper 144. When the optical disk 201 of a desired address is moved to a loading end position by the loading mechanism 6, the first frame portion 143 and the second frame portion 145 get closer to each other. With this, the damper 144 is magnetically attracted to the side of the disk table 141, and the optical disk 201 clamped by the loading mechanism 6 is subjected to a chucking on the disk table 141 by the damper 144.

By the way, according to the above-mentioned recording and/or playback apparatus shown in FIG. 1, in case that the optical disk supported at a desired address of the optical disk supporting portions 22 . . . 22 is broken, there is a problem that it is cumbersome to replace the broken optical disk with a new optical disk. In particular, there is a tendency that the number of the optical disks 201 supported on the rotating table 21 of the optical disk receiving portion 2 increases, for example, a few, then dozens, then a hundred, then two hundreds, and then three hundreds. As its number increases, the optical disks 201 . . . 201 are in a condition in which they are densely overlapped. Thus, there has been a problem that it is difficult to pick out a desired optical disk with one's fingertips or the like.

The present invention is capable of solving the above-mentioned conventional problems and of assuredly and easily taking out a disklike recording medium of a desired address.

DISCLOSURE OF THE INVENTION

A recording and/or playback apparatus of a dislike recording medium of the present invention comprises:

a receiving portion in which a plurality of supporting portions supporting respective peripheral ends of a plurality of disklike recording media are formed in an annular form and in which an opening portion (a cutout 174 in the specification) is formed on the supporting portion;

a recording and/or playback means for conducting recording and/or playback of the disklike recording media;

an ejecting operation means (an ejecting mechanism in the specification) that penetrates from the opening portion of the receiving portion and ejects a desired disklike recording medium out of the disklike recording media, from the supporting portion;

a loading means (a loading mechanism in the specification) that takes out the desired disklike recording medium, which has been ejected from the supporting portion by the ejecting operation means, from the receiving portion and loads the desired disklike recording medium onto the recording and/or playback means; and a positioning means (a conveyance means in the specification) that rotates the receiving portion and makes the desired disklike recording medium and the loading means oppose to each other.

The ejecting operation means comprises an ejecting lever that moves between a position, at which it projects into the supporting portion through the opening portion, and a position, at which it is separated from the receiving portion, and moves to the projecting position, thereby ejecting the disklike recording medium supported on the supporting portion.

The ejecting lever is formed on its one end side with a projection portion that goes into the supporting portion through the opening portion, and the ejecting lever is formed to be rotatable between the projecting position and the separated position.

The ejecting operation means comprises an operation mechanism that operates the ejecting lever to rotate between the projecting position and the separated position.

The operation mechanism comprises an operating slider (a sliding lever 196 in the specification) that operates the ejecting lever to rotate between the projecting position and the separated position, and a driving mechanism (a sliding lever driving mechanism 197 in the specification) of the operating slider.

The ejecting operation means is arranged on a lower surface side of the receiving portion.

The loading means comprises a holding portion (loading levers 92, 93 in the specification) that holds the desired disklike recording medium ejected from the supporting portion by the ejecting operation means and that conveys the held, desired disklike recording medium to the recording and/or playback means.

The holding portion is formed to be rotatable between a first position for holding the desired disklike recording medium ejected from the supporting portion by the ejecting operation means and a second position for conveying the held, desired disklike recording medium to the recording and/or playback means.

The holding portion is formed with a distance expanding operation portion (the reference sign 5 in the drawings) that widens a distance between the desired disklike recording medium ejected from the supporting portion by the ejecting operation means and another disklike recording medium received in the receiving portion.

The loading means comprises a holding operation mechanism (grooves for opening and closing operations 127 and others in the specification) that makes the holding portion hold the desired disklike recording medium ejected from the supporting portion by the ejecting operation means and that cancels the holding of the desired disklike recording medium after the disklike recording medium is conveyed to the recording and/or playback means.

The loading means comprises a retaining mechanism (a disk holding mechanism 7 in the specification) retaining the desired disklike recording medium which has been conveyed by the holding portion and of which holding by the holding portion has been canceled.

The holding mechanism comprises a retaining portion (supporting levers 132, 133 in the specification) that moves between a retaining position for retaining the desired disklike recording medium, of which holding by the holding portion has been canceled, and a non-retaining position at which it is separated from the disklike recording medium after the desired disklike recording medium has been installed on the recording and/or playback means.

The positioning means comprises a locking lever (the reference sign 52 in the drawings) that limits the rotation of the receiving portion by engaging with the receiving portion.

The recording and/or playback means comprises a table that rotates the desired disklike recording medium loaded by at least the loading means, and a chucking member that chucks the desired disklike recording medium, together with the table. The apparatus further comprises a cam body (the reference sign 74 in the drawings) formed with a first cam groove (the reference sign 77 in the drawings) that drives the loading means, a second cam groove (the reference sign 75 in the drawings) that works the positioning means, and a third cam groove (the reference sign 152 in the drawings) for chucking of the desired disklike recording medium by the table and the chucking member.

The recording and/or playback means comprises a first frame portion formed with the table and a second frame portion formed with the chucking member, and one of the first and second frames is to be rotated toward the other of the first and second frames by the third cam groove.

The positioning means is moved by a locking lever (the reference sign 52 in the drawings), which limits the rotation of the receiving portion by engaging with the receiving portion, and the second cam groove, and comprises an operation slider (slider 59 in the drawings) that rotates the locking lever between a position, at which it engages with the receiving portion, and a cancel position, at which the engagement with the receiving portion is canceled.

The other of the first and second frame portions is to be rotated toward the one of the first and second frame portions by the operation slider.

Furthermore, a recording and/or playback apparatus of a disklike recording medium according to the present invention comprises:

a receiving portion in which a plurality of supporting portions supporting respective peripheral ends of a plurality of disklike recording media are formed in an annular form and in which an opening portion (a cutout 174 in the specification) is formed on the supporting portion;

a recording and/or playback means for conducting a recording and/or playback of the disklike recording medium, the recording and/or playback means comprising a table that rotates the desired disklike recording medium loaded by at least the loading means, and a chucking member that chucks the desired disklike recording medium, together with the table;

a loading means (a loading mechanism in the specification) that takes the desired disklike recording medium out of the receiving portion and loads the desired disklike recording medium onto the recording and/or playback means;

a positioning means (a conveyance means in the specification) that rotates the receiving portion and makes the desired disklike recording medium and the loading means oppose to each other; and a driving means comprising a cam body (the reference sign 74 in the drawings) formed with a first cam groove (the reference sign 77 in the drawings) that drives the loading means, a second cam groove (the reference sign 75 in the drawings) that works the positioning means, and a third cam groove (the reference sign 152 in the drawings) for chucking of the desired disklike recording medium by the table and the chucking member.

BEST MODE FOR CONDUCTING THE INVENTION

Figure 1:
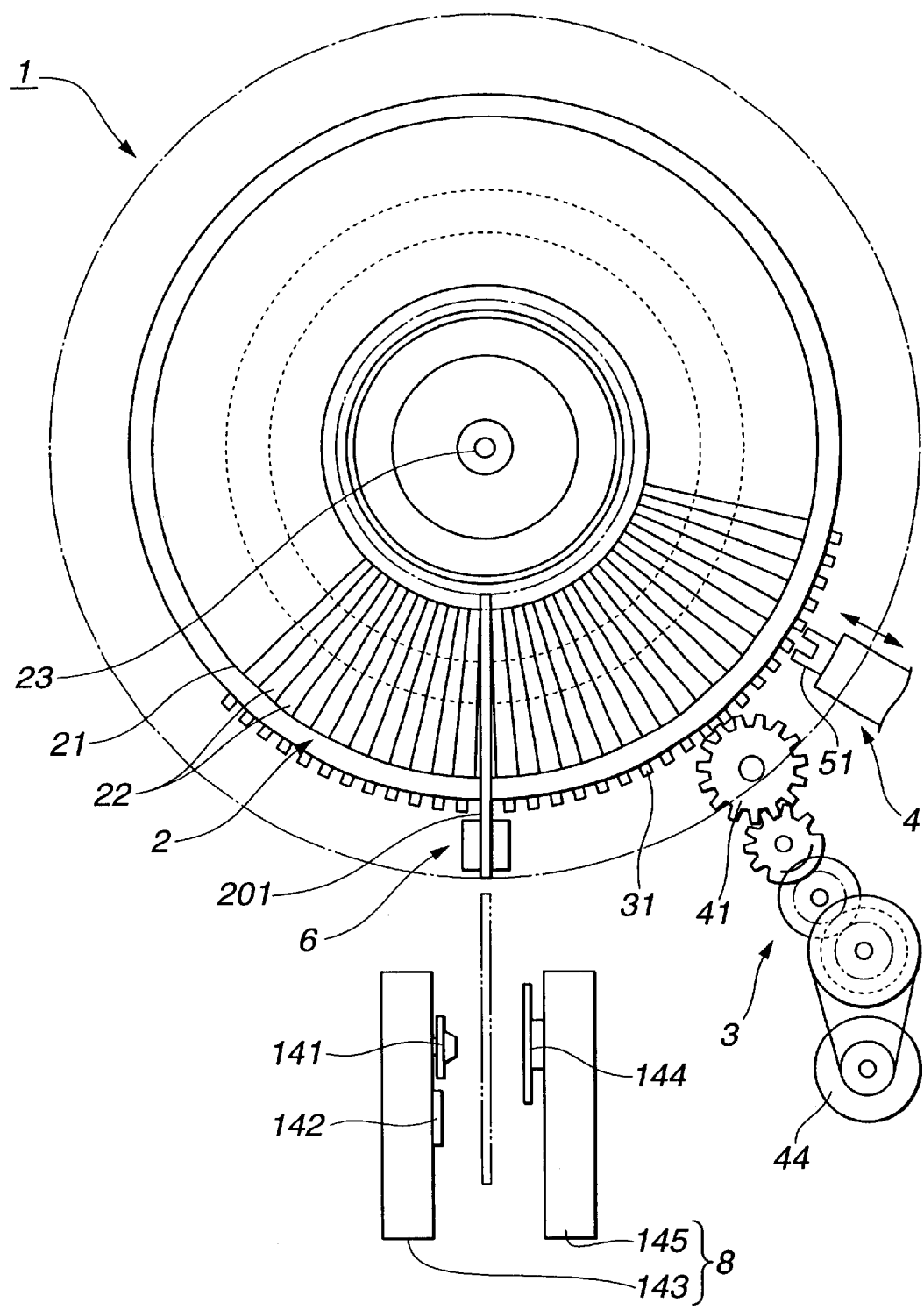
FIG. 1 is a plan view of a conventional example.
Figure 2:
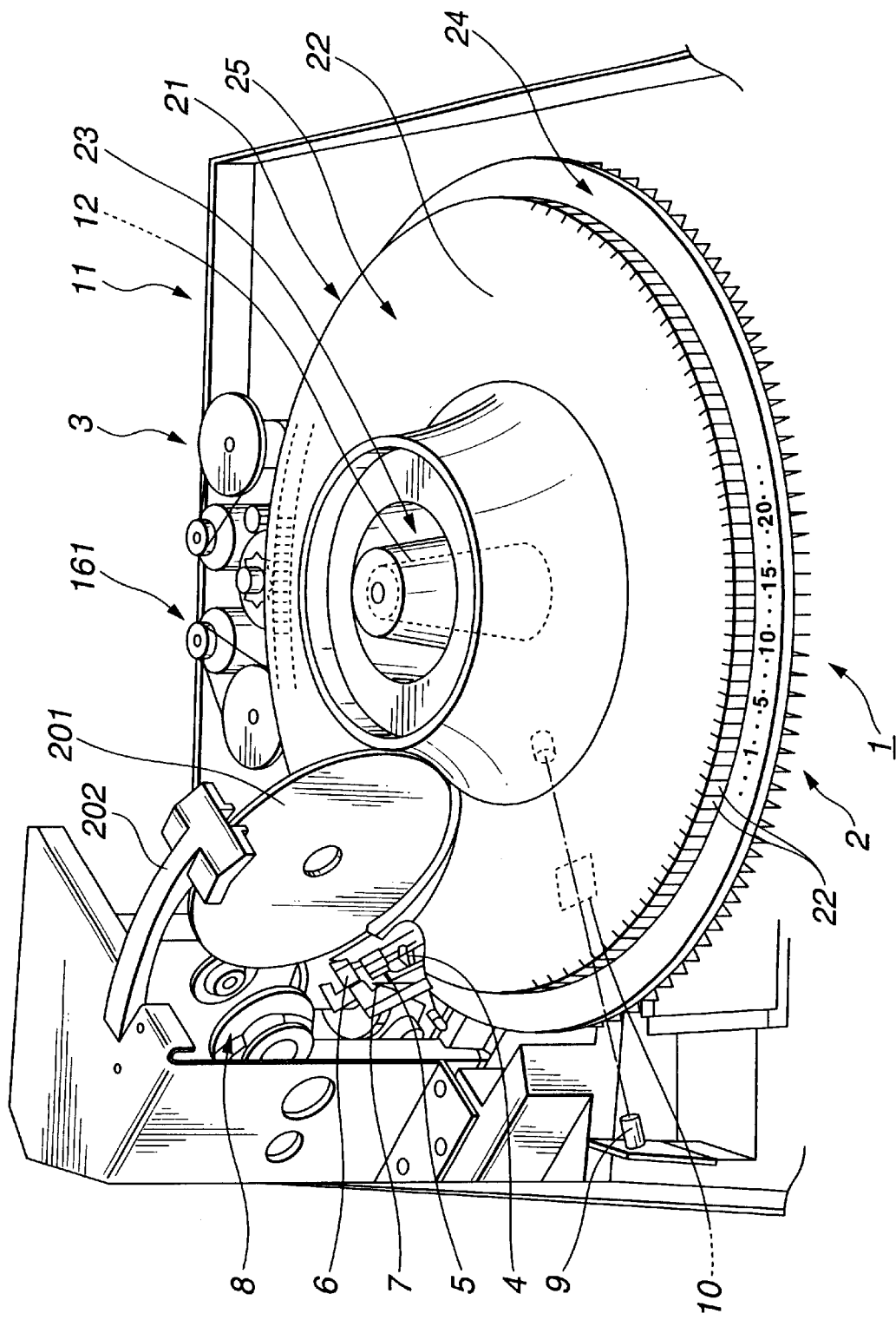
FIG. 2 is a perspective view of an essential portion.
Figure 3:
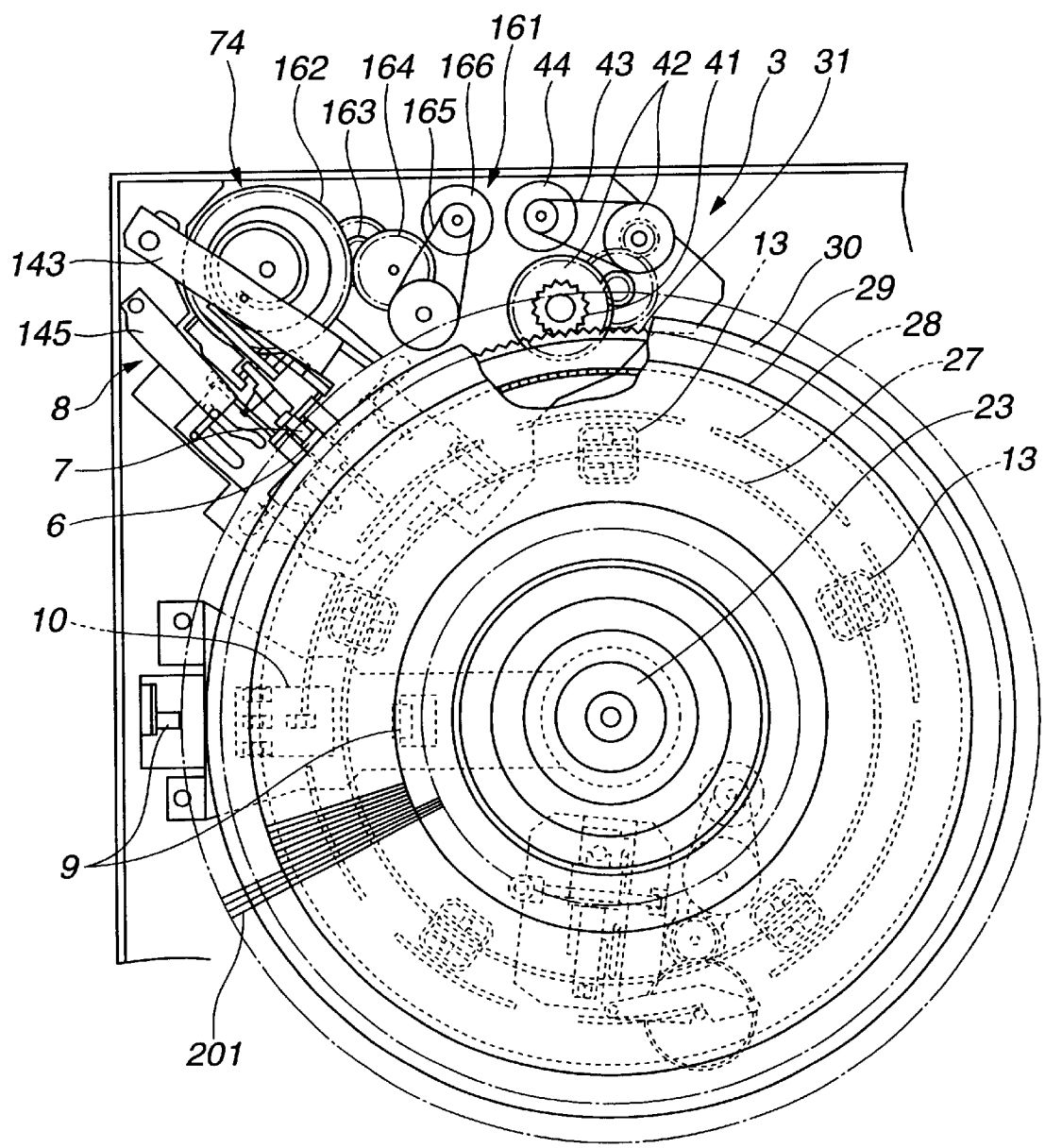
FIG. 3 is a plan view of an essential portion.

Next, a recording and/or playback apparatus (hereinafter referred to as recording and playback apparatus) 1 of a disklike recording medium (hereinafter referred to as disk) such as optical disk of the invention will be explained in order of (1) overview construction and operation of the apparatus as a whole, (2) construction of a disklike recording medium receiving portion (hereinafter referred to as disk receiving portion), (3) construction of a conveyance mechanism, (4) construction of a locking mechanism, (5) construction of a loading mechanism, (6) construction of a disklike recording medium distance widening mechanism (hereinafter referred to as disk distance widening mechanism), (7) construction of a disklike recording medium holding mechanism (hereinafter referred to as disk holding mechanism), (8) construction of a recording and/or playback portion (hereinafter referred to as a recording and playback portion), (9) construction of a mechanism for detecting the existence of a disklike recording medium (hereinafter referred to as a disk detecting mechanism), (10) construction of an address detecting mechanism, (11) construction of a disklike recording medium ejecting mechanism (hereinafter referred to as a disk ejecting mechanism), (12) operation, (13) modified examples, and (14) advantageous effects of the invention.

(1) Overview Construction and Operation of the Apparatus as a Whole

As shown in FIGS. 2–5, a recording and playback apparatus 1 according to the invention is equipped with a disk receiving portion 2 having disk supporting portions 22 . . . 22 of 300 of the first to 300th addresses for one-side supporting the lower end portions of the disks 201, a conveyance mechanism 3 for conveying the disk 201 of a desired address to a loading start position (unloading end position) by rotating the disk receiving portion 2, a locking mechanism 4 for locking the disk receiving portion 2 under a condition in which a desired disk 201 is adjusted to a disk loading start position, a loading mechanism 6 for transporting the disk 201, which is at the loading start position of the disk receiving portion 2 positioned by the locking mechanism 4, to the loading end position, and a recording and playback portion 8 for conducting an optical recording or playback of a disk 201 that has been transported by the loading mechanism 6 to the loading end position.

The recording and playback apparatus 1 is equipped with a disk distance widening mechanism 5 for the purpose of making it easier to clamp a desired disk by the loading mechanism 6, through penetrating into a space between a desired disk, which has been transported to the loading start position by the conveyance mechanism 3, and disks of its both sides and widening the distance of these disks of the both sides, and is equipped with a disk holding mechanism 7 between the loading mechanism 6 and the recording and playback portion 8, for temporarily supporting a disk 201 that has been transported to the loading end position by the loading mechanism 6 and its clamping by the loading mechanism 6 has been canceled, prior to its chucking at the recording and playback portion 8.

The recording and playback apparatus 1 has a disk detecting mechanism 9 that detects whether or not a disk is supported at a desired address of the disk receiving portion 2, and an address detecting mechanism 10 that detects a desired address of the receiving portion 2 and drives and controls the conveyance mechanism 3. The recording and playback apparatus 1 has a disk ejecting mechanism 19 for taking out a desired disk such as a disk of which abnormality was found upon the recording and playback.

When the recording and playback apparatus 1 is in the recording or playback mode by operating a switch of a control panel (not shown in the drawings) and the address of the disk supporting portion 22, on which a desired disk for conducting recording or playback is supported, is input, the disk receiving portion 2 is rotated by the conveyance mechanism 3 and the disk detecting mechanism 9 detects whether or not a disk is supported on the input address. Furthermore, the disk of an address input by the address detecting mechanism 10 is rotated to the position of the loading mechanism 6, and the rotation of the disk receiving portion 2 by the conveyance mechanism 3 is stopped.

The disk receiving portion 2 is unrotatably locked by the loading mechanism 4, and the disk distance widening mechanism operates, thereby penetrating into a space between a desired disk and disks of its both sides and widening the distance of these disks of the both sides.

As mentioned above, under a condition in which the distance between the disks on the both sides has been widened, the desired disk positioned at the center of these disks on the both sides is clamped by the loading mechanism 6 and transported from the loading start position to the loading end position.

The disk that has been transported to the loading end position by the loading mechanism 6 is released from the locking caused by the loading mechanism 6, placed on the disk holding mechanism 7, and made into a condition in which it has been positioned by the disk holding mechanism 7.

The disk 201 is subjected to a chucking by the recording and playback portion 8, and an optical recording and/or playback is conducted on the disk 201.

When the recording and/or playback of the disk 201 is finished, the disk, to which chucking of the recording and playback portion 8 was canceled, is once placed on the above disk holding mechanism 7, then clamped by the loading mechanism 6, and subjected to an unloading, thereby returning to the disk supporting portion 22 of the original disk receiving portion 2. In case that the disk of a desired address of the disk receiving portion 2 is taken out, it is adjusted to a disk drawing mode by operating a switch of the control panel not shown in the drawings. Furthermore, a desired address is input, and an eject starting button of the control panel not shown in the drawings is pushed. With this, the rotating table 21 rotates, and the disk of a desired address detected by the address detecting mechanism 10 stops when it comes to a position that is substantially directly above the disk ejecting mechanism 19. Furthermore, the disk ejecting mechanism 19 penetrates into the inside of the supporting portion 22, thereby pushing up the lower end of the disk 201. Thus, the disk 201 is pushed outside of other disks 201, and it can easily be taken out. Furthermore, 202 is a disk transportation guide member that supports a peripheral side of a disk 201, which is substantially opposed to a side supported by the disk loading mechanism 6, and guides the moving direction of the disk 201 transported by the above disk loading mechanism 6.

(2) Construction of Disk Receiving Portion 2

The disk receiving portion 2 is formed by providing disk supporting portions 22 . . . 22 of 300 in number of the first to 300th addresses in the form of a circular ring in the radial direction of the upper surface of a circular rotating table 21 that rotates about a shaft 12 formed on a chassis 11.

The rotating table 21 has at its central portion a bearing portion 23, at its most peripheral portion an address display portion 24, and an arcuate surface 25 of a curvature substantially the same as that of the periphery of the disk 201, between the bearing portion 23 and the address display portion 24.

Figure 6:
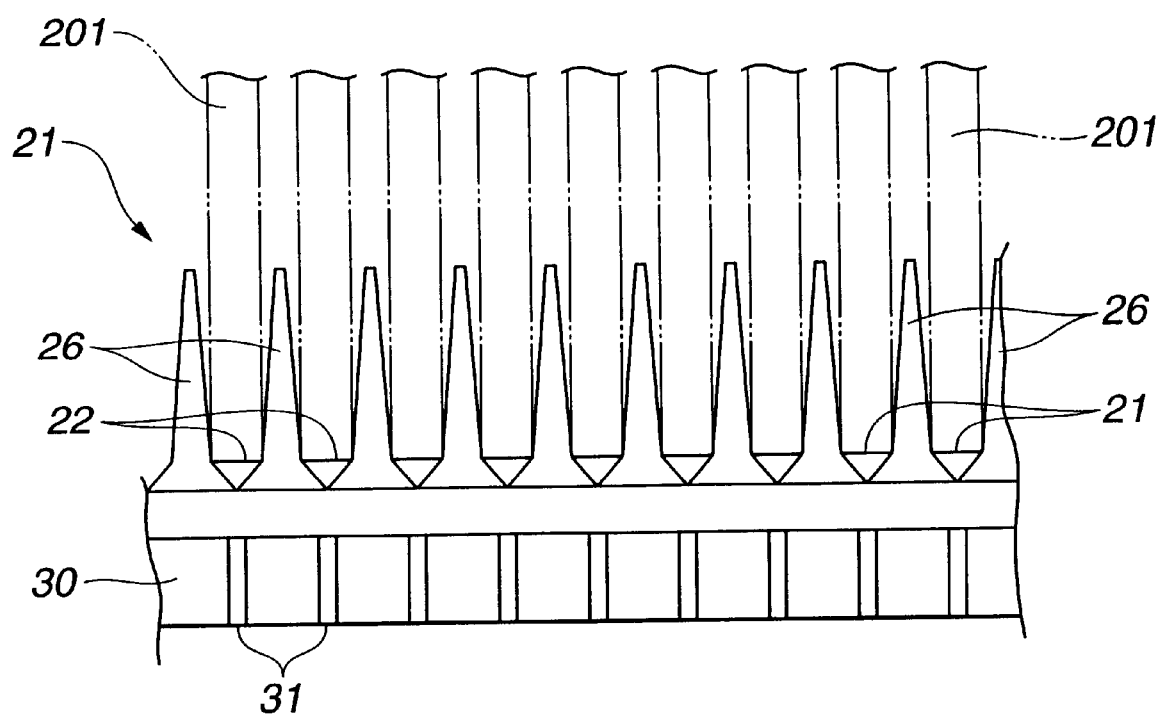
FIG. 6 is an enlarged front view of a disk supporting portion.

As shown in FIG. 6, the disk supporting portions 22 . . . 22 of the first to 300th addresses are formed between ribs 26, 26 radially formed on the upper surface of the arcuate surface 25.

The disk supporting portions 22 . . . 22 of the first to 300th addresses are radially formed on the arcuate surface 25 of the rotating table 21 to have an angular distance of 360°/300° and support one side of a disk 201 in a manner to make it stand substantially upright by engaging the lower end of the disk 201.

Figure 7:
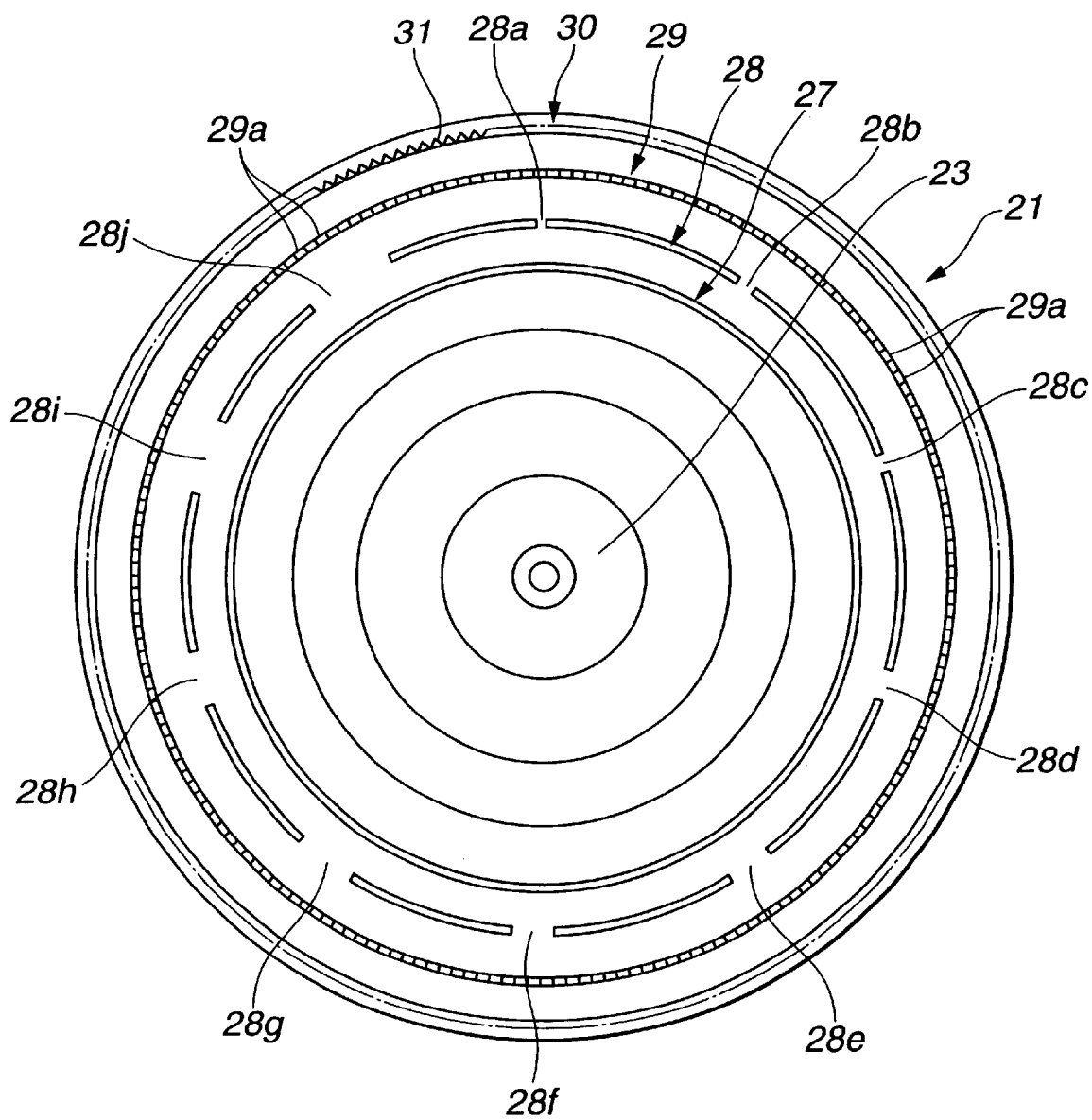
FIG. 7 is a bottom view of a rotating table.

FIG. 7 is a plan view showing a reverse of the rotating table 21. A bottom surface of the rotating table 21 has first, second, third and fourth annular projections 27, 28, 29 which are concentrically formed about the central bearing portion 23 in the form of truncated cone, in a direction from the inner side to the outer side.

The most peripheral fourth annular ringlike projection 30 has at its peripheral surface gear teeth 31 . . . 31 that mesh with a 13 table driving gear of the conveyance mechanism 3, which will be explained in the following.

The third annular projection 29 is formed with slits 29a . . . 29a (hereinafter referred to as slits for detecting minor addresses) of a number corresponding to that of the addresses. The second annular projection 28 is formed with ten slits (hereinafter referred to as slits for detecting major addresses) 28a–28j having different sizes. The most inner peripheral first annular projection 27 is one for smoothly rotating the rotating table 21.

Figure 8:
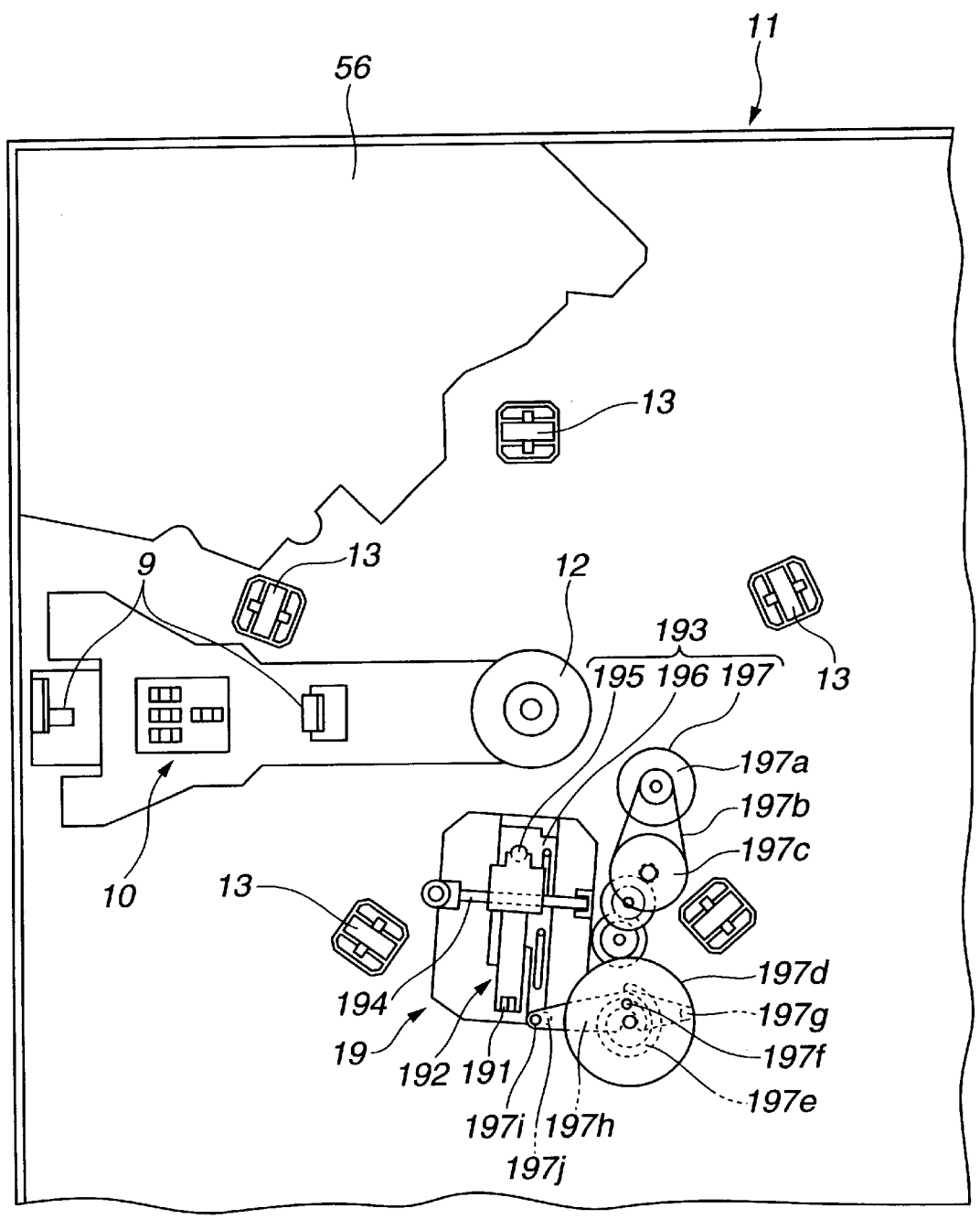
FIG. 8 is a plan view of a chassis.

As shown in FIGS. 7 and 8, the rotating table 21 is rotatably fixed to the chassis 11 by inserting the shaft 12 in the form of truncated cone, formed on the above chassis 11, into the bearing 23 and by placing the first annular projection 27 on the table supporting rollers 13 . . . 13 formed on the chassis 11, and is rotated by the after-explained conveyance mechanism 3.

(3) Construction of Conveyance Mechanism 3

Figure 4:
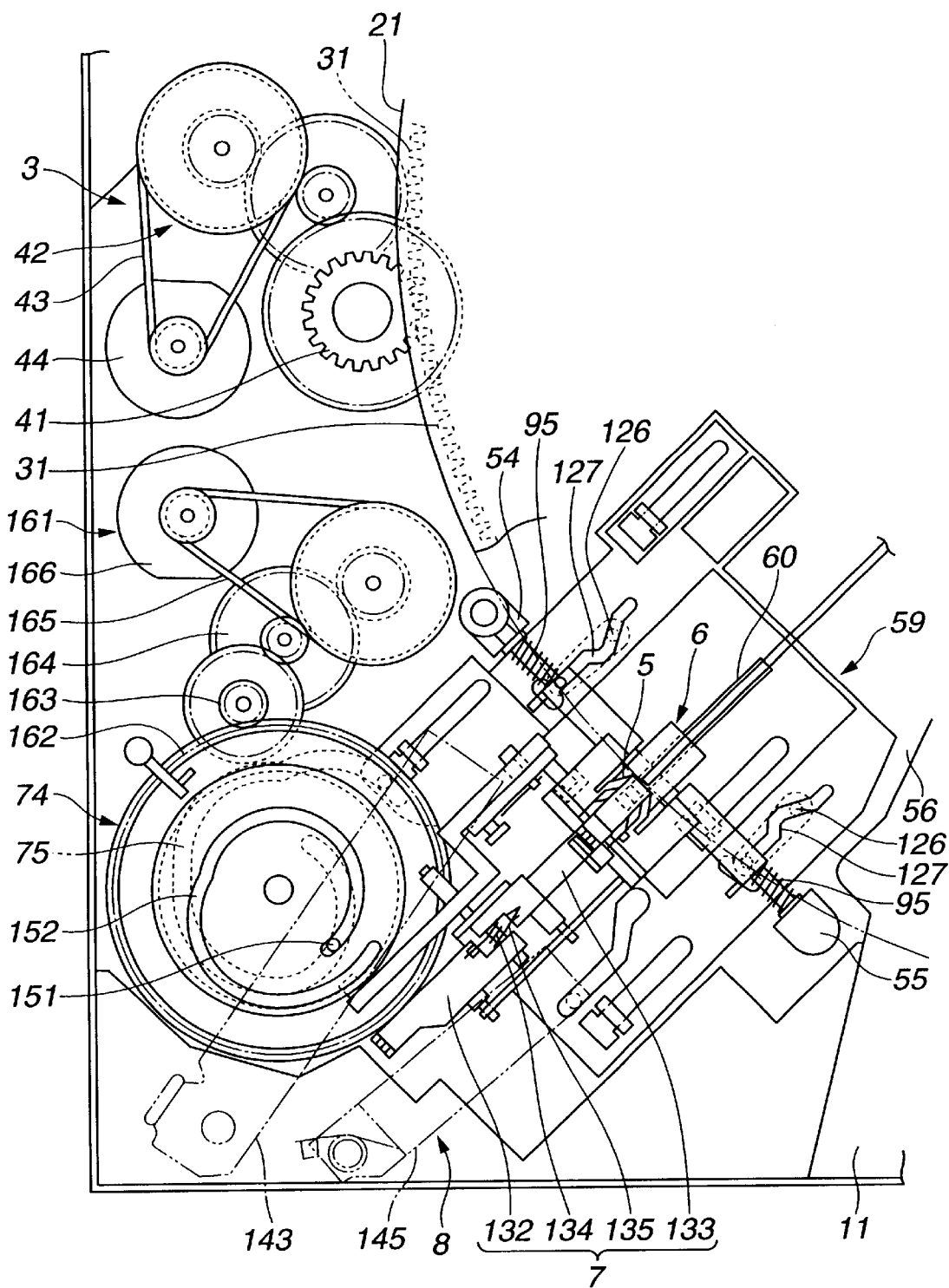
FIG. 4 is an enlarged plan view of an essential portion.
Figure 5:
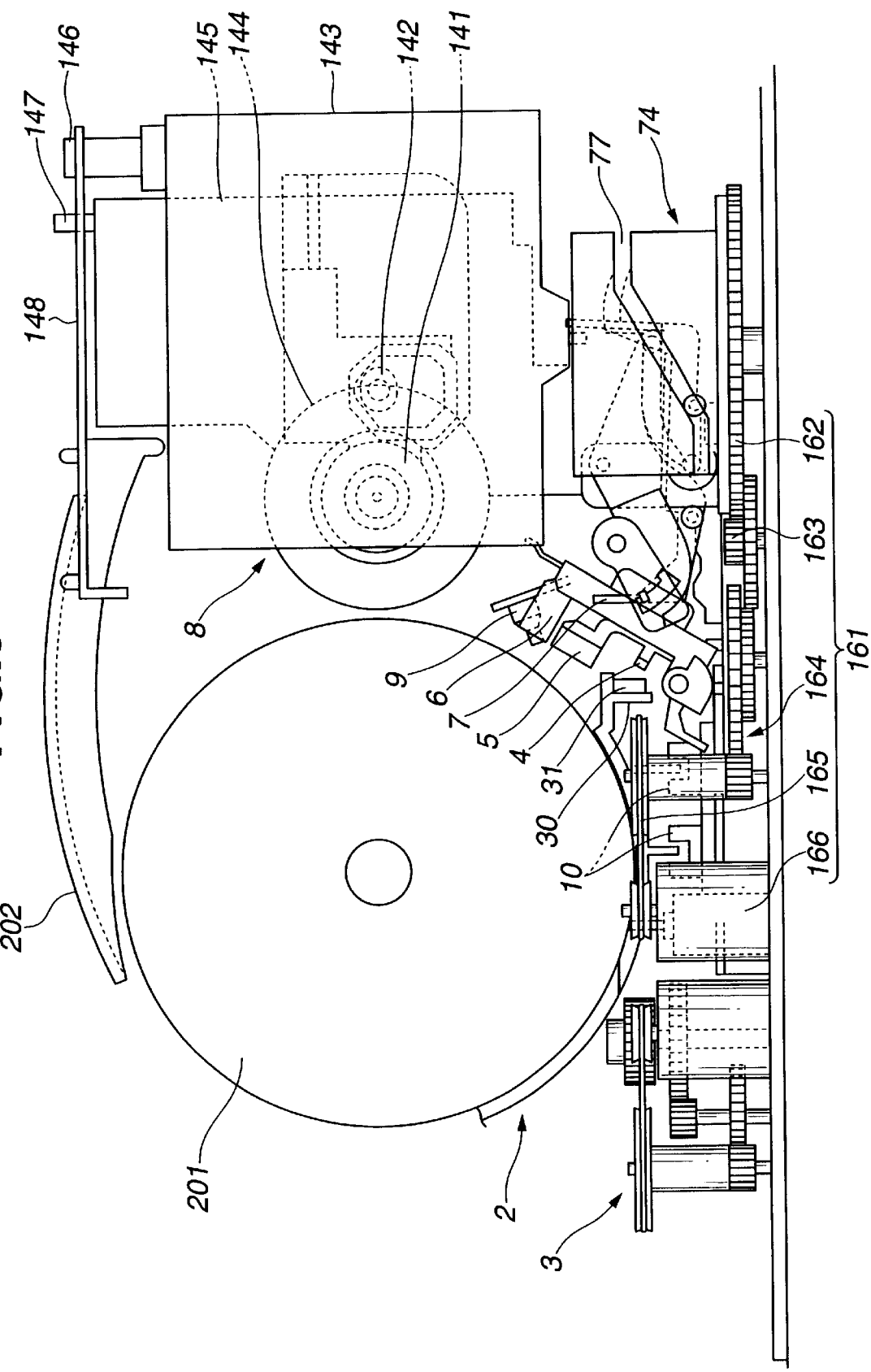
FIG. 5 is a side view of an essential portion.

As shown in FIG. 4, the conveyance mechanism 3 is equipped with a table driving gear 41 that meshes with gear teeth 31 . . . 31 formed on an outer peripheral surface of the fourth annular projection 30 of the rotating table 21, a gear train 42, a driving belt 43 and a motor 44.

The motor 44 rotates the table driving gear 41 through the driving belt 43 and the gear train 42, thereby rotating the rotating table 21.

The motor 44 is controlled by the address detecting mechanism 10, and its driving is stopped when the disk 201 of a desired address has moved to the position of the loading mechanism 6.

(4) Construction of Locking Mechanism

Figure 9:
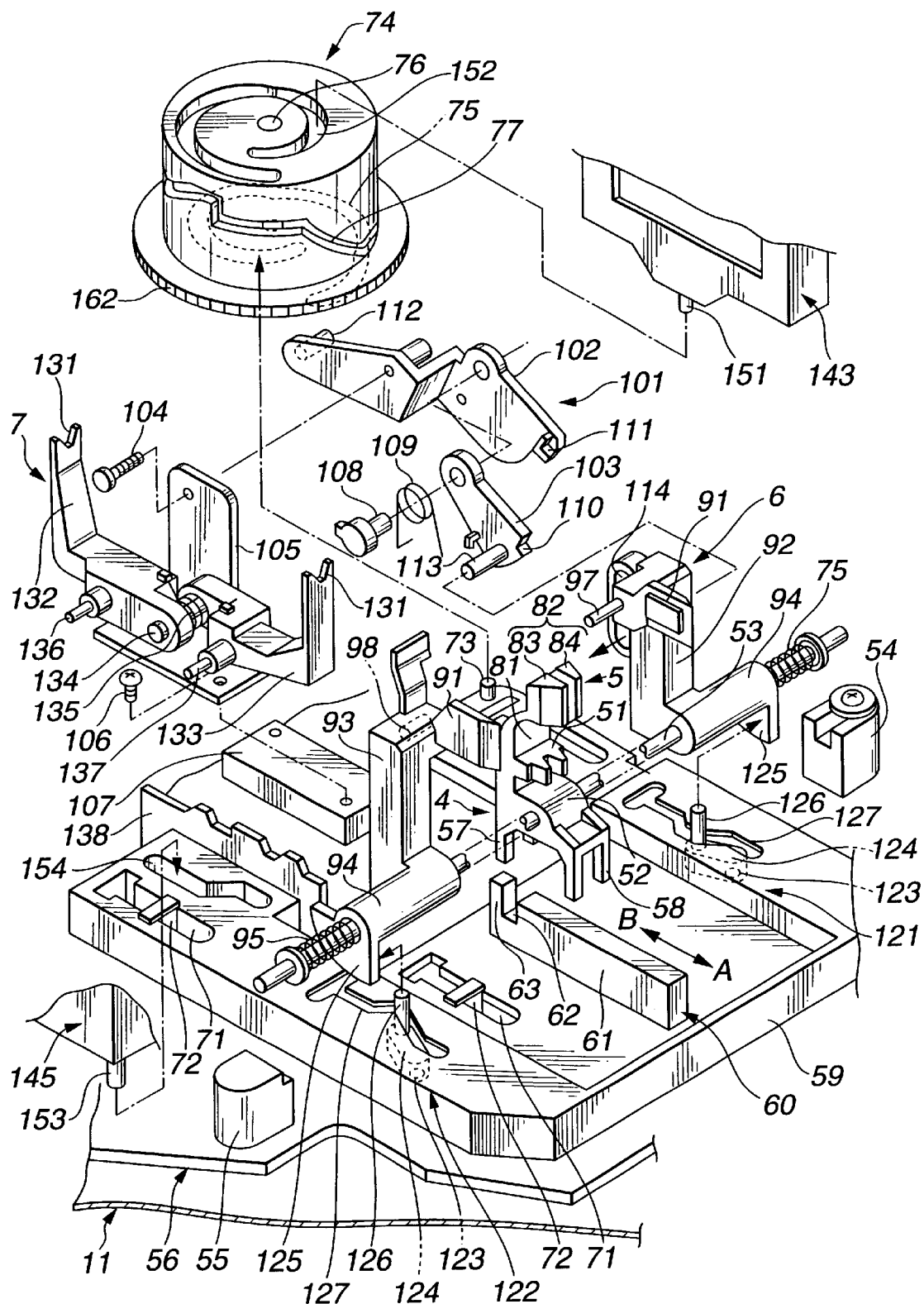
FIG. 9 is an exploded perspective view of an essential portion.
Figure 10:
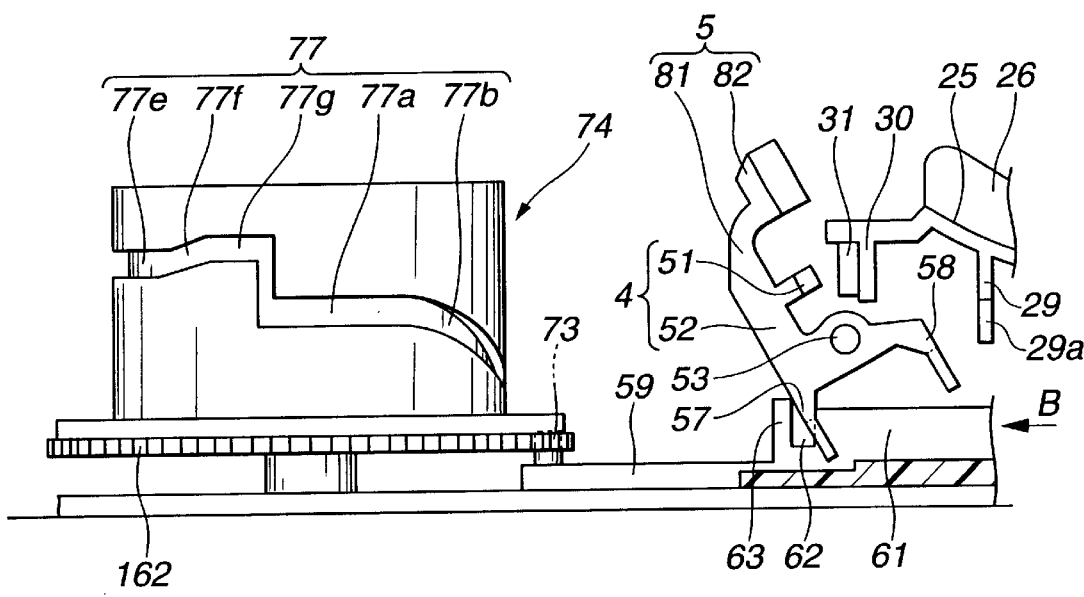
FIG. 10 is a side view of a locking mechanism before locking.
Figure 11:
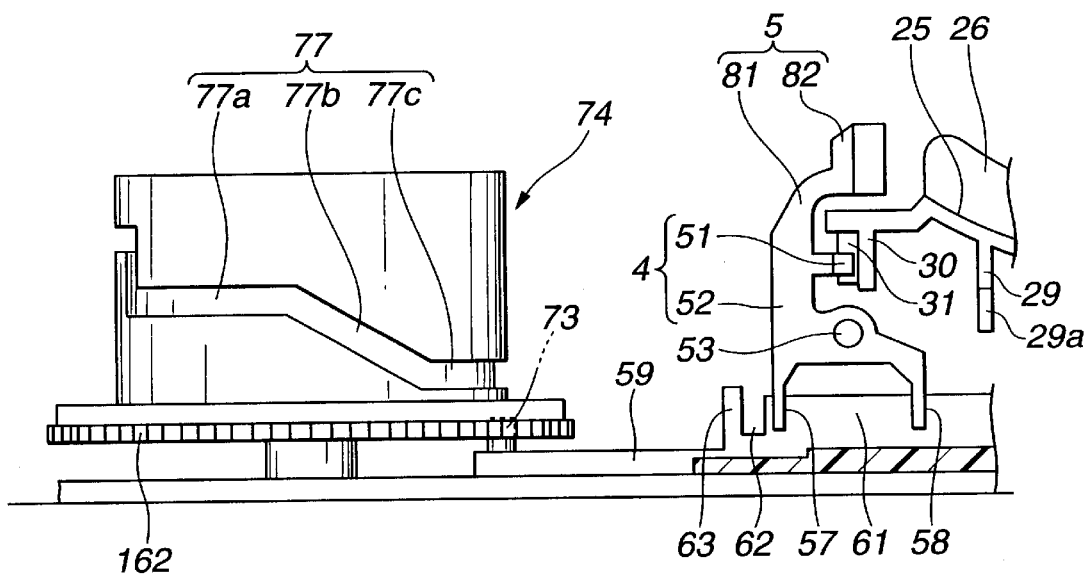
FIG. 11 is a side view of a locking mechanism after locking.

As shown in FIGS. 9–11, the locking mechanism 4 is equipped with a locking lever 52 formed with a table engaging portion 51 that engages with the gear teeth 31 . . . 31 formed on the outer peripheral surface of the fourth annular projection 30 of the rotating table 21.

The locking lever 52 is rotatably fixed to a shaft 53. When it is rotated about the shaft 53 in one direction, the table engaging portion 51 is brought into engagement with the gear teeth 31 . . . 31, thereby locking the rotating table 21. When it is rotated in the other direction, the engagement between the table engaging portion 51 and the gear teeth 31 . . . 31 is canceled, thereby releasing the locking of the rotating table 21. The shaft 53 is supported on a base plate 56 made of plastic, through a pair of bearings 54, 55. The base plastic made of plastic is fixed onto the chassis 11.

The locking lever 52 has first and second slide guiding portions 57, 58, each being inverse-U in shape, at positions of about 120° and 240° relative the table engaging portion 51 around the shaft 53.

The inverse-U-shaped first and second slide guiding portions 57, 58 are supported in a manner to straddle a locking lever supporting portion 60 of a rail shape formed on an upper surface of a slide plate 59 fixed to the base plate 56 to be slidable in a direction of arrows A and B.

The rail-shaped locking lever supporting portion 60 is equipped with a locking portion 61 for maintaining a condition in which the table engaging portion 51 is in engagement with the gear teeth 31 . . . 31 of the rotating table 21, a locking canceling portion 62 for canceling the engagement between the table engaging portion 51 and the gear teeth 31 . . . 31 of the rotating table 21 by rotating the locking lever 52 in a direction to cancel the locking, and a locking operating portion 63 for rotating the locking lever 52 from the locking canceled condition to the locked condition.

As shown in FIG. 10, in a condition in which the inverse-U-shaped first slide guiding portion 57 is positioned at the locking canceling portion 63, the locking lever 52 is inclined toward the locking canceling direction, and the engagement between the table engaging portion 51 and the gear teeth 31 . . . 31 of the rotating table 21 is in a canceled condition.

When the sliding plate 59 is slidingly moved in the direction of the arrow B from this condition, the back surface side of the first slide guiding portion 57 is pressed by the locking operating portion 63. With this, the locking lever 52 is rotated to the locking direction, and, as shown in FIG. 11, the first slide guiding portion 57 and the second slide guiding portion 58 are placed on the locking portion 61. Thus, the locking lever 52 is brought into a condition in which it stands substantially uprightly, and the table engaging portion 51 is brought into engagement with the gear 31 . . . 31 of the rotating table 21, thereby inhibiting the rotation of the rotating table 21.

As shown in FIG. 9, the sliding plate 59 is fixed onto the base plate 56 by an elongate hole 71 and a pin 72 to be slidable in the A-B direction.

The sliding plate 59 is formed at its one end portion with a cam engaging pin 73.

The cam engaging pin 73 is in engagement with a cam groove 75 that is formed on a bottom surface of a cam 74 and serves for operating the slide plate.

Figure 12:
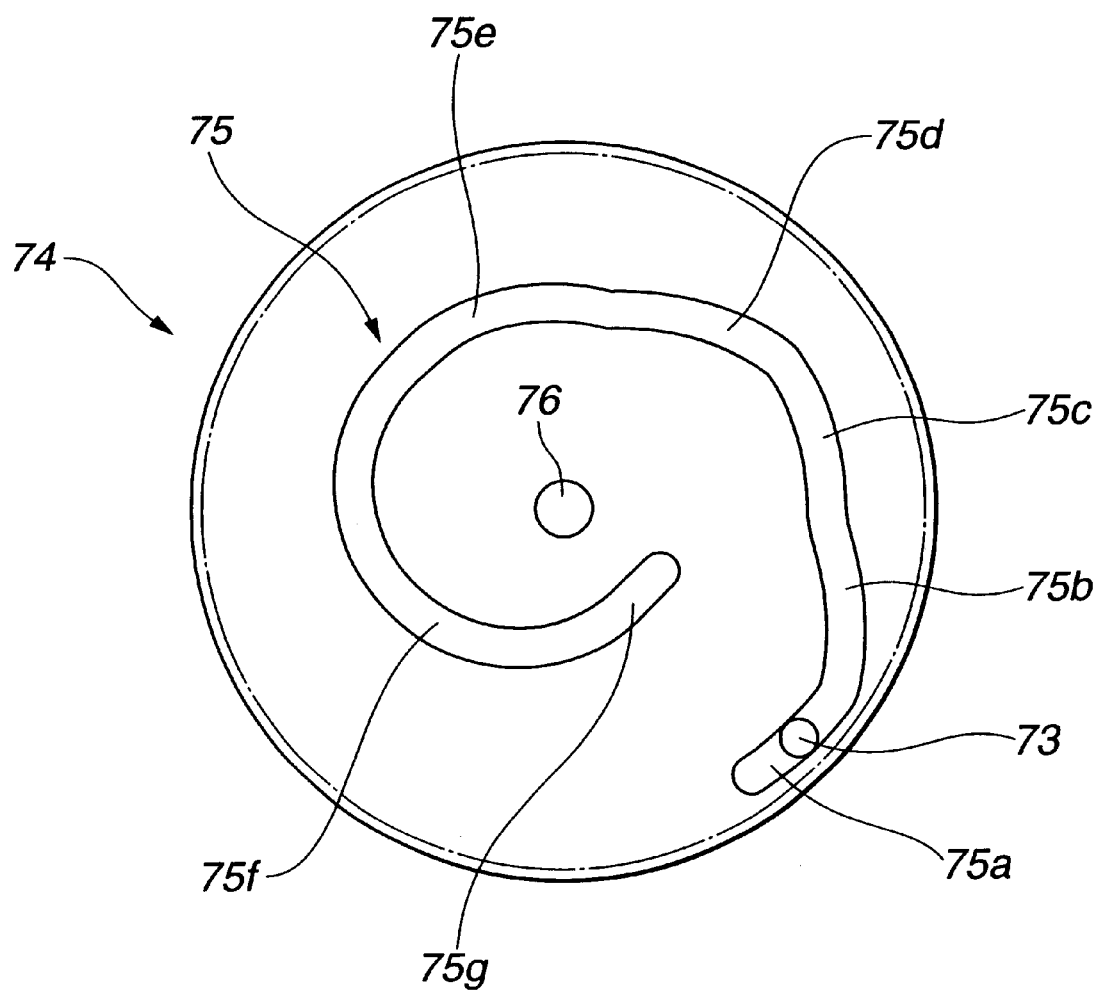
FIG. 12 is a bottom view of a cam.

FIG. 12 is a bottom view of the cam 74 for operating the sliding plate. In a condition in which the cam engaging pin 73 is positioned at a first groove portion 75a of one end portion of the cam groove 75 for operating the sliding plate, the sliding plate 59 is in a condition in which it has slidingly moved farthest in the direction of the arrow A of FIG. 9, and thereby the locking lever 52 is in the locking canceled condition. When the cam 74 is rotated in the clockwise direction from this condition, the cam engaging pin 73 moves in a second groove portion 75b. The sliding plate 59 is slidingly moved in the direction of the arrow B of FIG. 9 by the second groove portion 75b, and thereby the locking lever 52 is rotated in the locking direction by the locking operating portion 63 of the rail-shaped locking lever supporting portion 60. Thus, the first and second slide guiding portion 57, 58 are allowed to ride on the locking portion 61 of the locking lever supporting portion 60, thereby locking the rotating table 21.

Figure 22:
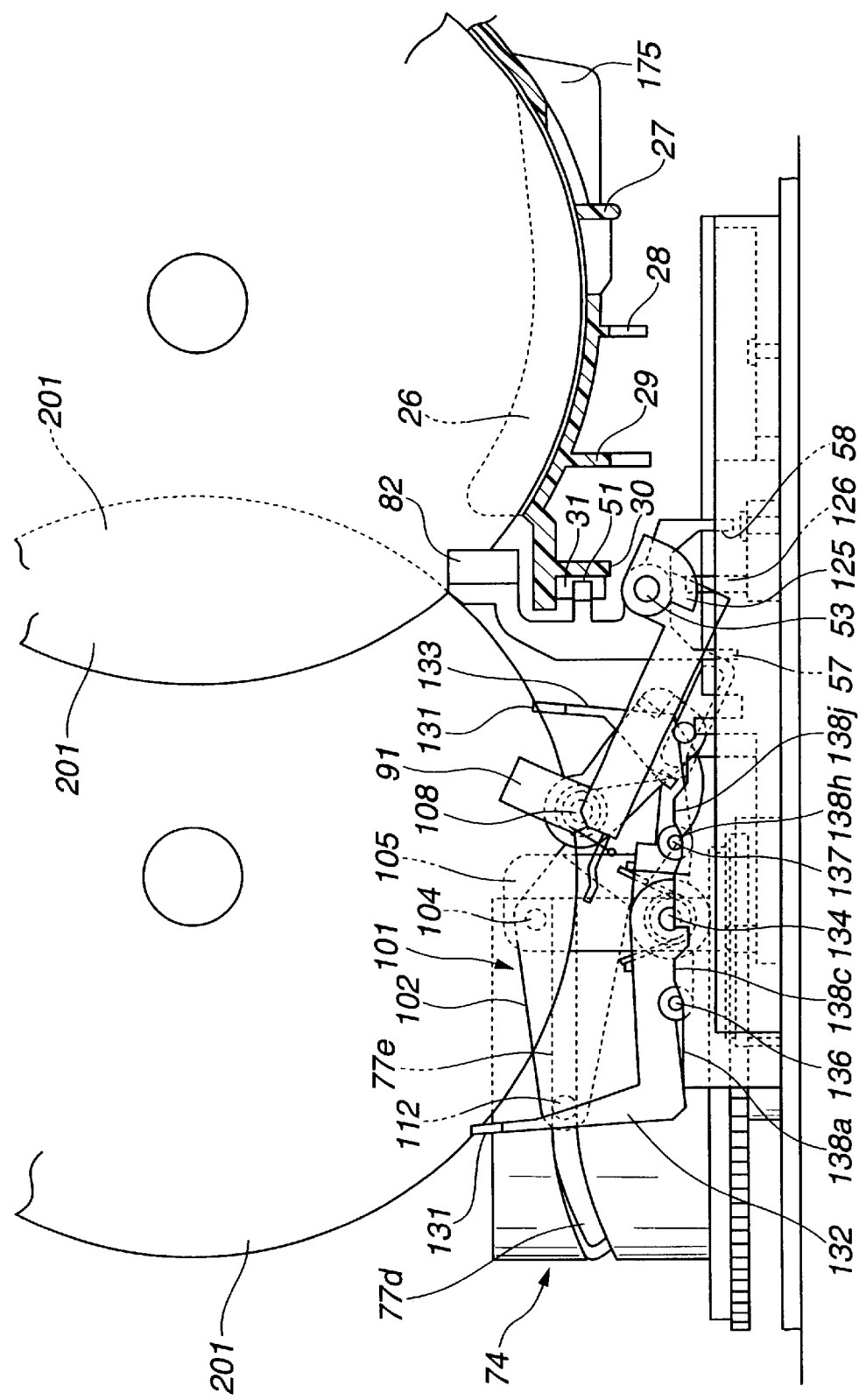
FIG. 22 is a side view of a condition in which the conveyance of a disk has been finished.

When the cam 74 rotates further in the clockwise direction, the cam engaging pin 73 moves in a third groove portion 75c. The third groove portion 75c is concentrically formed about a rotation shaft 76 of the cam 74, and thereby the sliding plate 59 does not slide but is maintained under a stopped condition. During the cam engaging pin 73 moves in a fifth groove portion 75e, a rotation mechanism 101 of the loading mechanism 6 is operated by a cam groove 77 that is formed on the peripheral surface of the cam 74 and serves for rotating the loading mechanism, thereby transporting the disk clamping portions 91, 91 of the loading arms 92, 93 and the disk 201 to the loading end position, as shown in FIG. 22.

Figure 23:
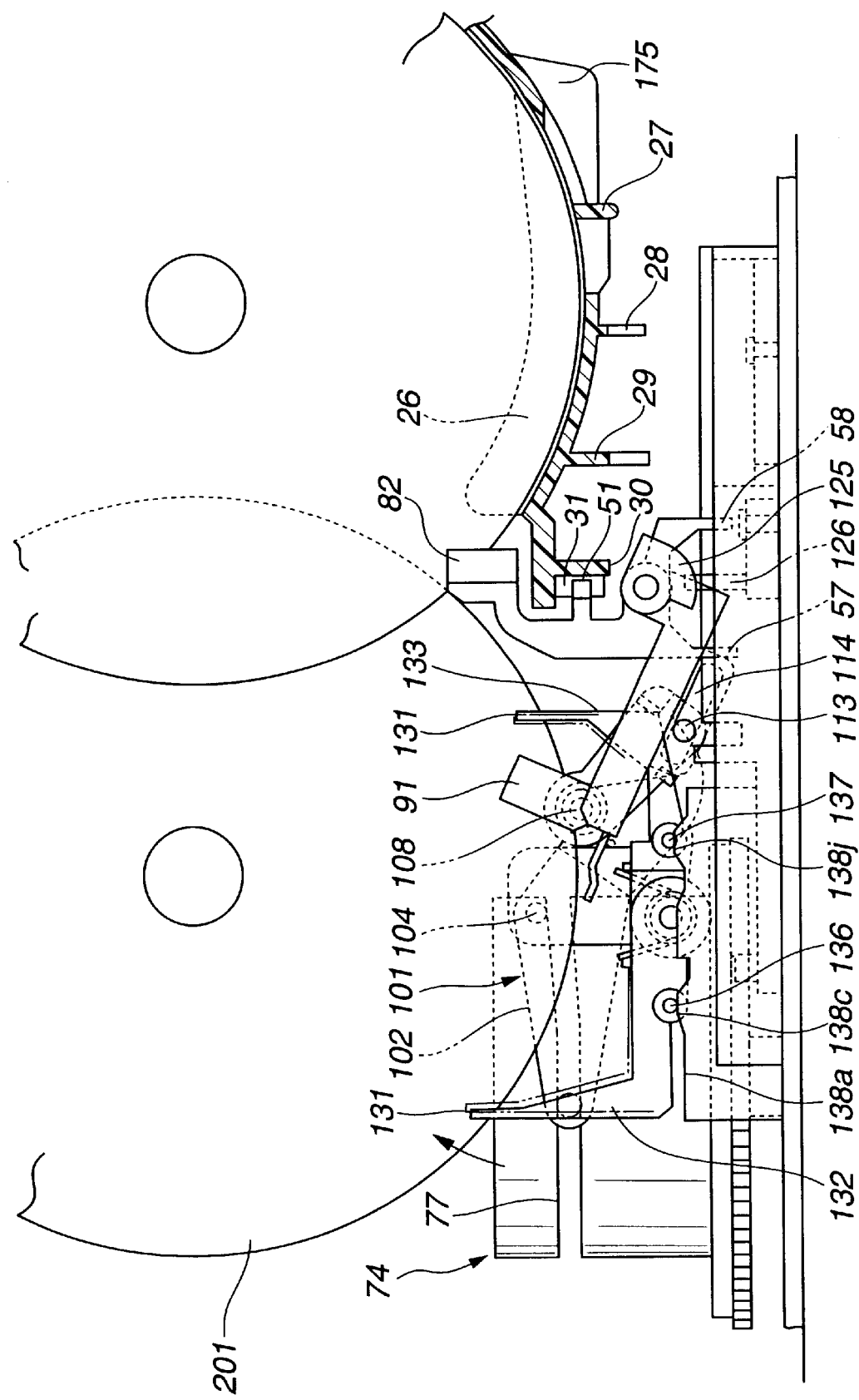
FIG. 23 is a side view of a condition in which clamping of a disk by the disk clamping portion has been canceled.
Figure 24:
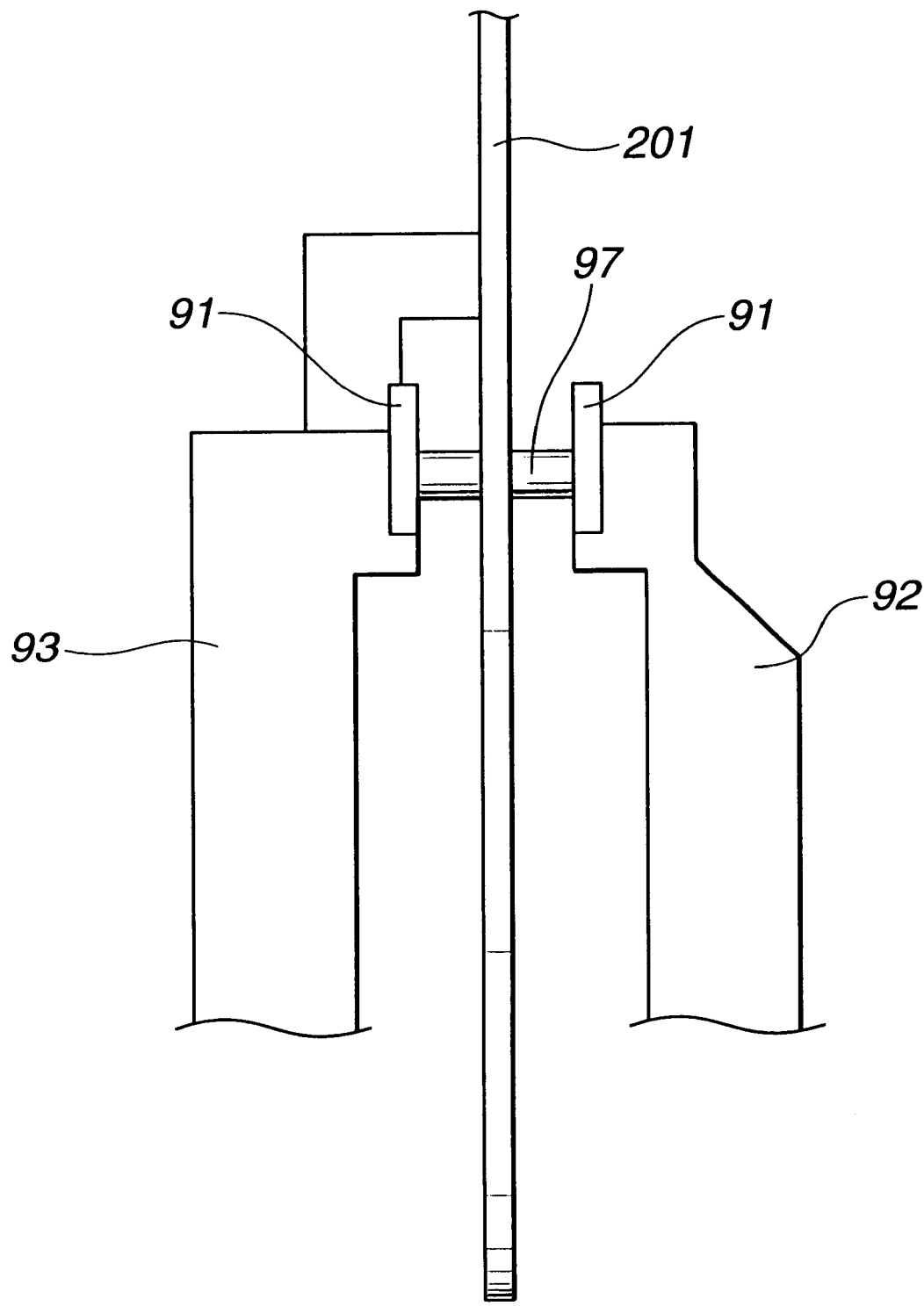
FIG. 24 is a front view of FIG. 23.

When the cam 74 rotates further in the clockwise direction, the cam engaging pin 73 moves in a sixth groove portion 75f, thereby making the sliding plate 59 slide to the position of FIG. 23. During this, as shown in FIG. 24, the disk clamping portions 91 of a pair of loading arms 92, 93 are moved away from each other by opening and closing mechanisms 121, 122 of the loading means 6, thereby canceling the locking of the disk 201. The cam engaging pin 73 is introduced into a seventh groove portion 75g.

(5) Construction of Disk Distance Widening Mechanism 5

As shown in FIG. 9, a disk distance widening mechanism 5 is equipped with an arm portion 81 formed at an upper portion of the disk engaging portion 51 of the locking lever 52 to be monolithic therewith, and with a disk engaging portion 82 formed at an upper portion of the arm portion 81 to be monolithic therewith. The disk engaging portion 82 has first and second disk abutting pieces 83, 84 that are disposed to have a space that is greater than the thickness of the disk 201.

The disk distance widening mechanism 5 rotates together with the locking lever 52, and, at substantially the same time when the table engaging portion 51 of the locking lever 52 engages with the gear teeth 31 . . . 31 of the rotating table 21, widens the distance between disks positioned at both sides of a desired disk positioned at the loading start position of the rotating table 21 by the disk engaging portion. Upon this, the desired disk at the loading start position is introduced into a space between the first and second disk abutting pieces 83, 84 in a manner not to be in contact with these first and second disk abutting pieces 83, 84. On the other hand, the first and second disk abutting pieces 83, 84 penetrate into a space between the desired disk and disks supported on its both sides, and inclined surfaces 83a, 84a on outer sides of the first and second disk abutting pieces 83, 84 press against the disks on the both sides in a direction which is perpendicular to the disk surface, thereby widening the distance between these disks of the both sides and that.

In a condition in which the distance between the disks of the both sides and that has been widened by the disk distance widening mechanism 5, the desired disk between these disks of the both sides, disposed at the loading start position, is clamped by the after-mentioned loading mechanism 6 and transported to the side of the recording and playback portion 8.

(6) Construction of Loading Mechanism 6

The loading mechanism 6 is equipped with first and second loading levers 92, 93 formed at their one end sides with disk clamping portion 91 for clamping the front and back surfaces of a peripheral portion of a desired disk disposed at the loading start position.

Cylindrical bearing portions 94 are formed on the other sides of the first and second loading levers 92, 93. Using the bearing portions 94, they are attached on both side portions of the locking lever 52 in a manner that they are rotatable relative to the shaft 53 and movable in a longitudinal direction of the shaft.

The first and second loading levers 92, 93 are pressed against both side surfaces of the locking lever 52 by coil springs 95 attached to the shaft 53, and it is clamped by a pair of disk clamping portions 91, 91 from directions of the front and back surfaces of the disk under the pressed condition.

The first loading lever 92 is formed at its upper end portion with a connecting pin 97, and the second loading lever 93 is formed at its upper end portion with a pin fitting hole 98.

The connecting pin 97 is fitted into the pin fitting hole 98, and, when the first loading lever 92 is rotated by the after-explained loading lever rotation mechanism 101, the second loading lever is also rotated integrally.

The loading lever rotation mechanism 101 is equipped with a first rotating lever 102 and a second rotating lever 103 fixed to the first rotating lever 102.

The first rotating lever 102 is rotatably fixed to a frame 105 through a threaded shaft 104. The frame 105 is attached to a base 107 of the base plate 56 through a screw 106.

The second rotating lever 103 is rotatably attached to one end side of the first rotating lever 102 through a shaft 108.

The second rotating lever 103 is provided with a rotational force by a return coil spring 109 attached to the shaft 108, and an engaging portion 110 formed on the free end side is pressed against an engaging portion 111 formed on one end portion of the first rotating lever 102, and furthermore its rotation is inhibited.

The first rotating lever 102 is formed at its one end portion with a cam engaging pin 112, and the cam engaging pin 112 is inserted into a cam groove 77 formed on the peripheral surface of the cam 74, for the loading mechanism rotation operation.

The second rotating lever 103 is formed on its free end side with a loading lever engaging pin 113, and the engaging pin 113 is inserted into an elongate hole 114 formed on a back surface of the first loading lever 92.

Figure 13:
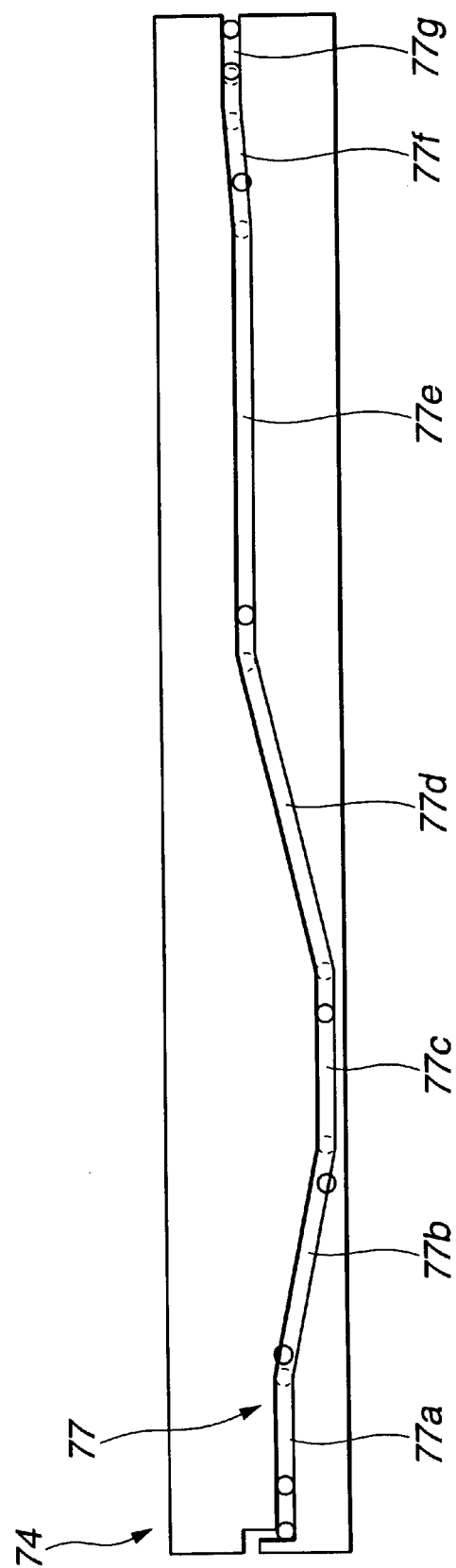
FIG. 13 is a development of a cam formed on a peripheral surface of a cam, for a loading mechanism rotation operation.

FIG. 13 is a development of a cam groove 74 formed on the peripheral surface of the cam 74, for the loading mechanism rotation operation.

The cam groove 77 is equipped with a horizontal first groove portion 77a, a down-grade second groove portion 77b continuous with the first groove portion 77a, a horizontal third groove portion 77c continuous with the second groove portion 77b, an up-grade fourth groove portion 77d continuous with the third groove portion 77c, a horizontal fifth groove portion 77e continuous with the fourth groove portion 77d, an up-grade sixth groove portion 77f continuous with the fifth groove portion 77e, and a horizontal seventh groove portion 77g continuous with the sixth groove portion 77f.

Figure 17:
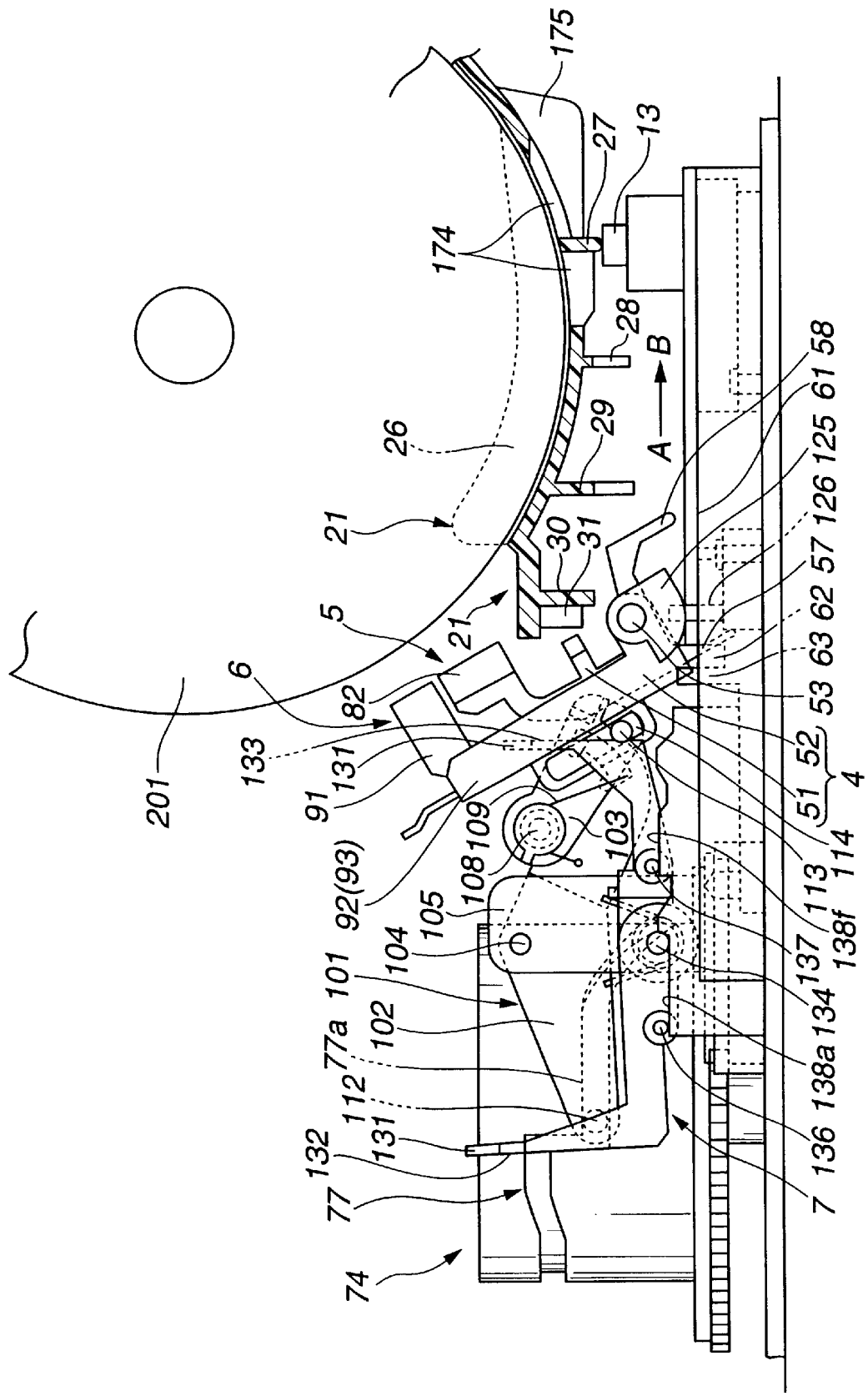
FIG. 17 is a side view of an essential portion under a waiting condition.

When the cam engaging pin 112 of the rotation mechanism 101 is positioned in the first groove 77a, the disk clamping portions 91 of the first and second loading levers 92, 93 stop at a waiting position, as shown in FIG. 17.

Figure 18:
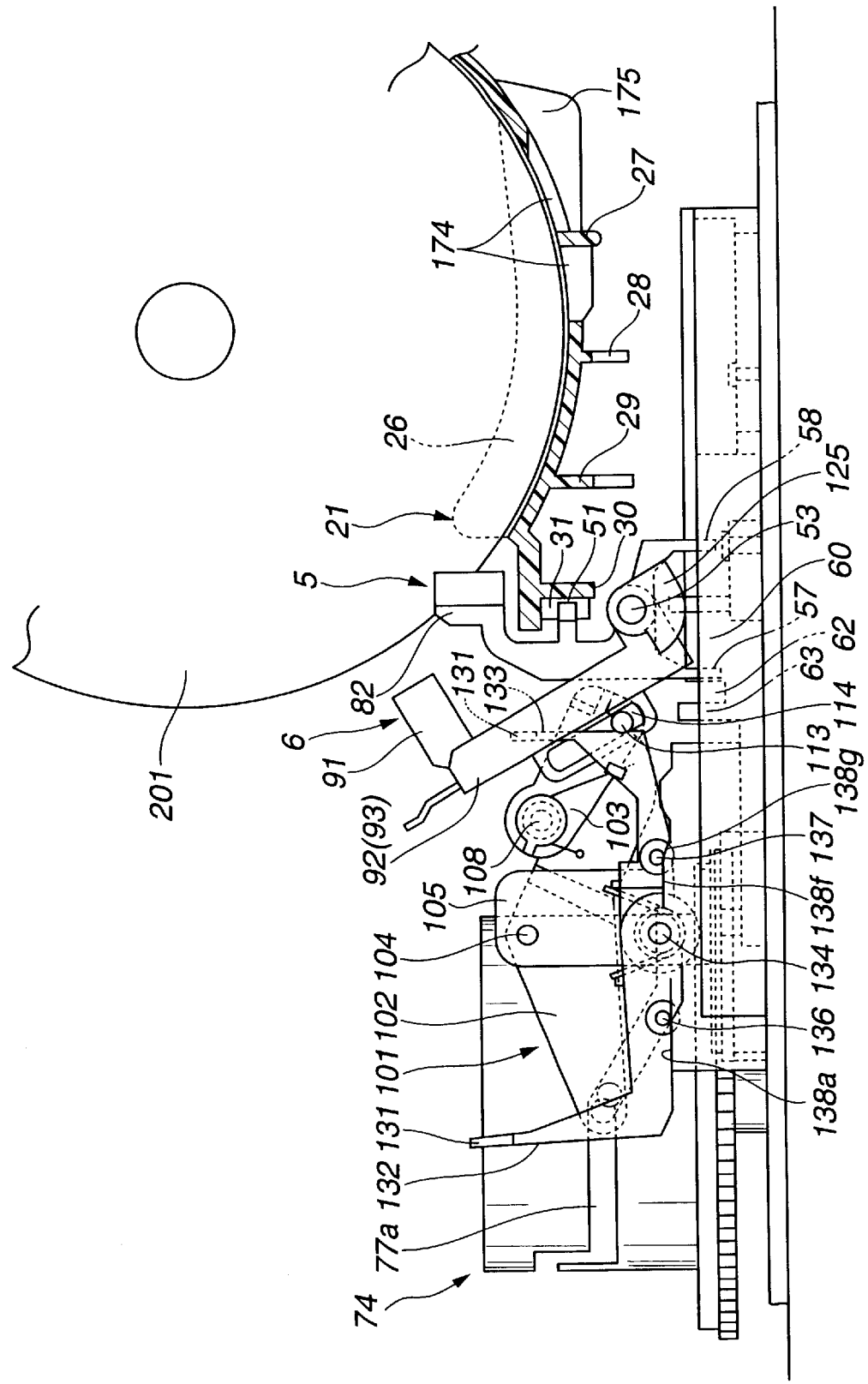
FIG. 18 is a side view of an essential portion under a locked condition.

When the cam 74 is rotated from this condition, the sliding plate 59 is slidingly moved. With this, as shown in FIG. 18, the rotating table 21 is locked by the locking mechanism 4, and the distance between the disks is widened by the disk distance widening mechanism 5.

Figure 19:
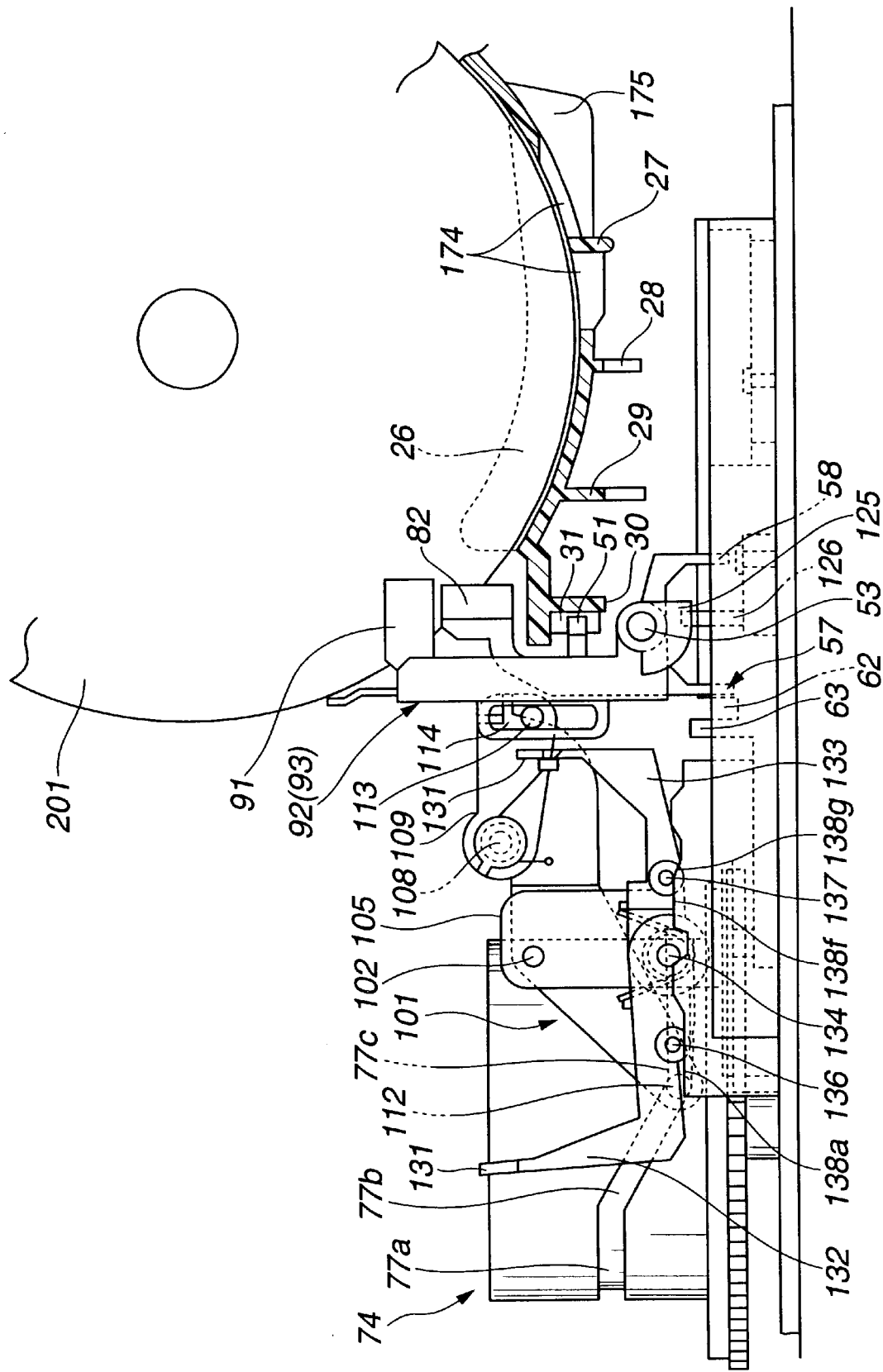
FIG. 19 is a side view of a condition in which a disk clamping portion has moved.

As the cam engaging pin 112 moves to a lower end of the second groove portion 77b, the first and second loading levers 92, 93 rotates toward the rotating table 21. Thus, as shown in FIG. 19, the disk clamping portions 91, 91 move from the waiting position to the loading start position.

During the cam engaging pin 112 moves within the third groove portion 77c, the disk clamping portions 91, 91 stop at the loading start position.

As the cam engaging pin 112 moves to the fifth groove portion 77e after the third and fourth groove portions 77c, 77d, the first and second loading levers 92, 93 rotate in a direction to be away from the rotating table 21. Thus, as shown in FIG. 22, the disk clamping portions 91, 91 and the disk 201 move to the loading end position.

During the cam engaging pin moves within the fifth groove portion 77e, the disk clamping portions 91, 91 stop at the loading end position.

Figure 26:
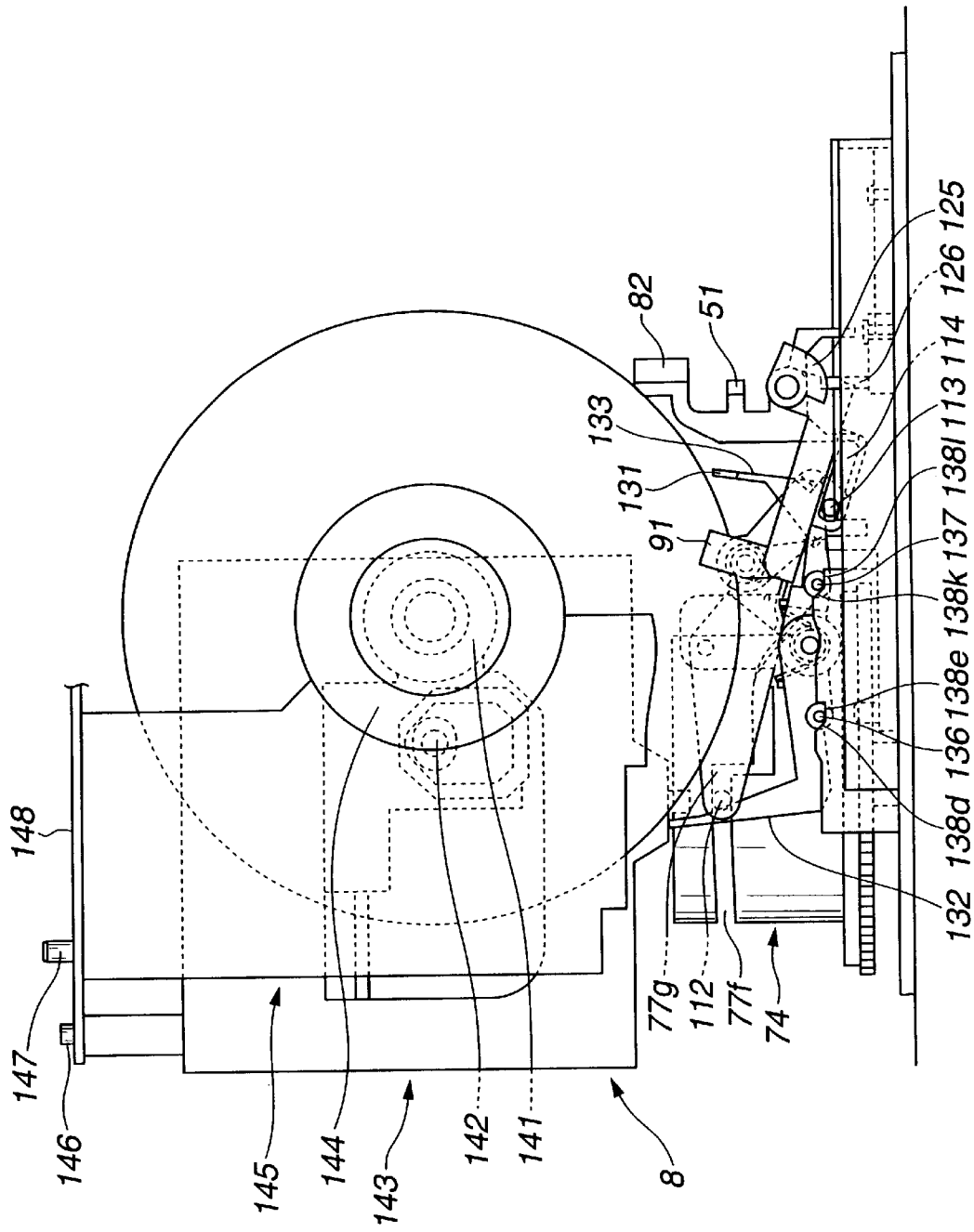
FIG. 26 is a side view of a condition in which a disk holding mechanism has been lowered.

As the cam engaging pin 112 moves to the seventh groove portion 77g after passing the sixth groove portion 77f, as shown in FIG. 26, the disk clamping portions 91, 91 move to the most lowered position which is slightly lower than the loading end position.

During the cam engaging pin 112 moves within the seventh groove portion 77g, the disk clamping portions 91, 91 stop at the most lowered position.

The loading mechanism 6 is equipped with first and second opening and closing mechanisms 121, 122 that close the disk clamping portions 91, 91 of the first and second loading levers 92, 93 at the loading start position to clamp the disk and open the disk clamping portions 91, 91 at the loading end position to cancel the clamping of the disk.

As shown in FIG. 9, the opening and closing mechanisms 121, 122 are equipped with rotating arms 124 that are rotatably fixed on the base plate 56 made of plastic by shafts 123, opening and closing operating pins 126 that are formed to stand on free end sides of the rotating arms 124 and have ends in abutment with the inner surfaces of the pin abutment portions 125 formed on one ends of the bearings 94 of the loading levers 92, 93, and cam grooves 127 for the opening and closing operation, which move the opening and closing pins 126 in the longitudinal direction of the shaft 53.

The cam grooves 127 for the opening and closing operation are formed on the upper surface of the sliding plate 59 and moves the opening and closing operation pins 126 along the grooves 127.

Figure 14:
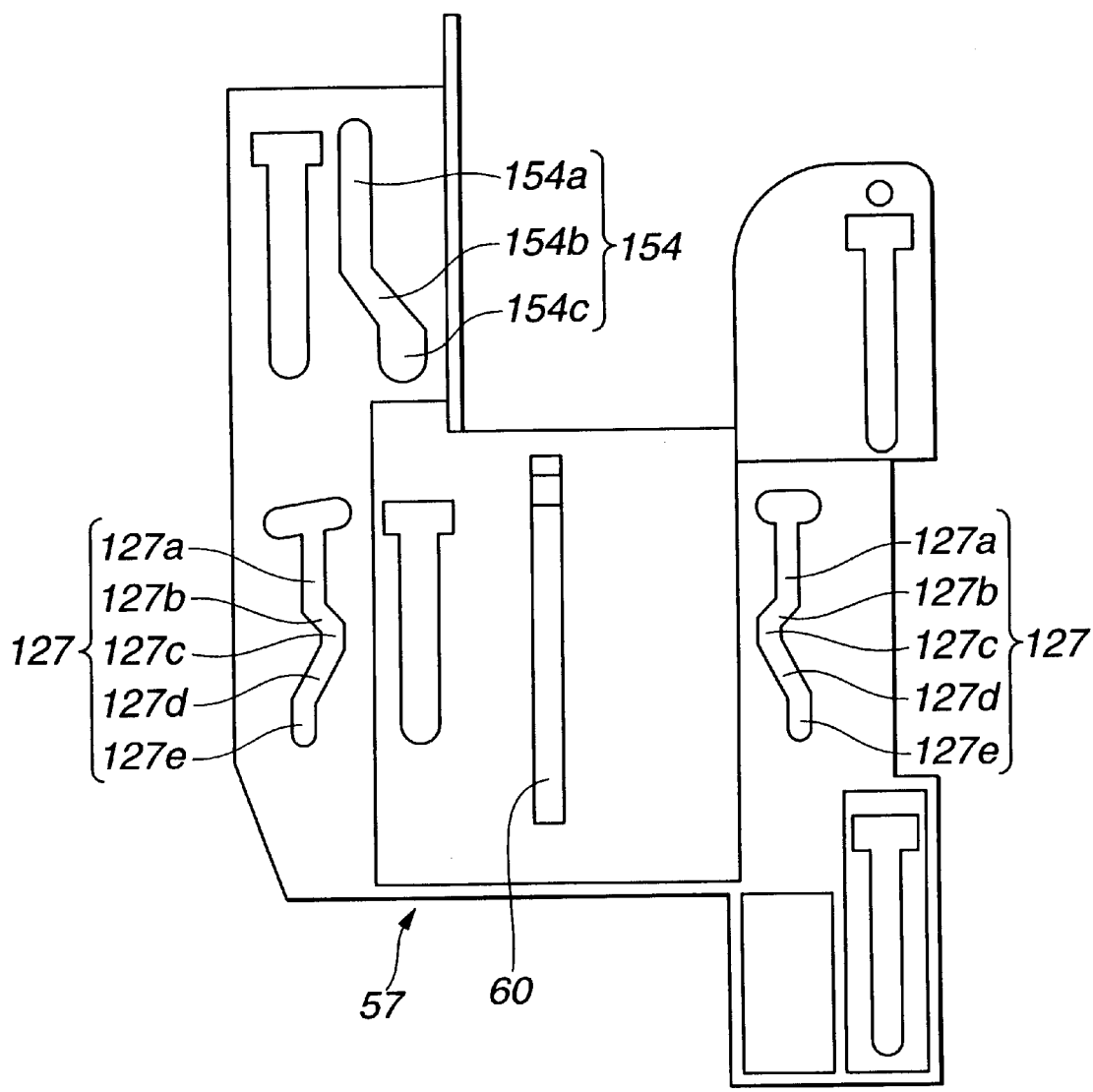
FIG. 14 is a plan view of a slide plate.

As shown in FIG. 14, the cam groove 127 for the opening and closing operation is equipped with a first groove portion 127a extending in a sliding direction of the sliding plate 59, a second groove portion 127b that is continuous with the first groove portion 127a and extends in a manner to be inclined toward the inner side, a third groove portion 127c that is continuous with the second groove portion 127b and extends substantially parallel with the sliding direction of the sliding plate 59, a fourth groove portion 127d that is continuous with the third groove portion 127c and extends in a manner to be inclined toward the outer side, and a fifth groove portion 127e that is continuous with the fourth groove portion 127d and extends parallel with the sliding direction of the sliding plate 59.

When the opening and closing operation pins 126 are positioned at the first groove portions 127a, the pin abutment portions 125 or the first and second loading levers 92, 93 are pressed by the pins 126 in opposition to spring force of coil springs 94. Thus, the disk clamping portions 91, 91 formed on these first and second loading levers 92, 93 are spaced away from each other, and there is provided a condition in which the disk can be inserted into a space between the disk clamping portions 91, 91.

When the opening and closing operation pins 126 move within the second groove portions 127b, the pin abutment portions 125 or the first and second loading levers 92, 93 are moved by spring force of the coil springs 94 in a direction in which disk clamping portions 91, 91 formed on these first and second loading levers 92, 93 get close to each other.

When the opening and closing operation pins 126 move to the third groove portions 127c, the disk is clamped by the disk clamping portions 91, 91 of the first and second loading levers 92, 22

When the opening and closing operation pins 126 move within the fourth grooves 127d, a pair of the disk clamping portions 91, 91 are again opened by the opening and closing operation pins 126, and a pair of the disk clamping portions 91, 91 are maintained in an opened condition by the fifth grooves 127e.

(7) Construction of Disk Holding Mechanism 7

The disk holding mechanism 7 is interposed between the loading mechanism 6 and the recording and playback portion 8 and temporarily supports the disk which has been transported to the loading end position by the loading mechanism. After the precision of the loading end position (chucking start position) of the disk is improved, chucking of the disk is conducted by the recording and playback portion 8.

As shown in FIG. 9, the disk holding mechanism 7 is constituted of generally L-shaped first and second disk supporting levers 132, 133 formed at their one end portions with V-shaped disk supporting portions 131 supporting both side portions of a lower end side of the disk transported to the loading end position by the loading levers 92, 93, a shaft 134 connecting the first and second disk supporting levers 132, 133 to a frame 105 in a rotatable manner in a condition in which the other end portions thereof are overlapped, a return coil spring 135 providing the first and second disk supporting levers 132, 133 with a rotational force in a direction in which the disk supporting portions 131 are lowered, a first cam engaging pin 136 formed on the first disk supporting lever 132, a second cam engaging pin 137 formed on the second disk supporting lever 133, and a cam plate 138 with which the first and second cam engaging pins 136, 137 engages. The cam plate 138 is formed on the sliding plate 59.

Figure 15:
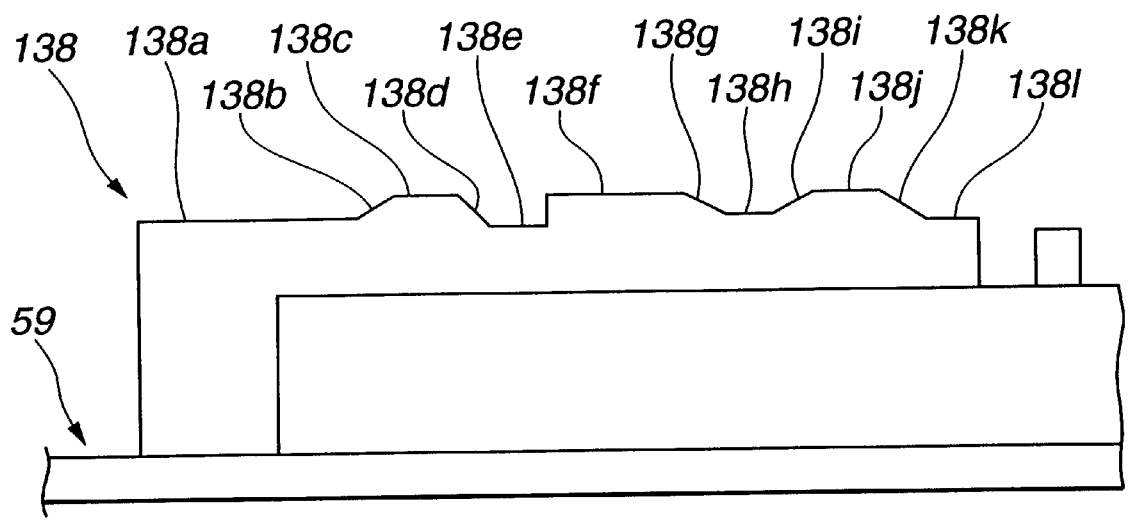
FIG. 15 is a side view of a cam plate formed on the slide plate.

As shown in FIG. 15, the cam plate 138 is equipped with first to fifth cam surfaces 138a–138e, on which the first cam engaging pin 136 moves, and sixth to twelfth cam surfaces 138f–138l, on which the second cam engaging pin 137 moves.

As shown in FIG. 17, when the table engaging portion 51 of the locking mechanism 3, the disk engaging portion 82 of the disk distance widening mechanism 5 and the disk clamping portions 91 of the loading mechanism 6 are at the waiting position, the first cam engaging pin 136 is positioned at one end portion of the first cam surface 138a, and the second cam engaging pin 137 is positioned on the sixth cam surface 138f. Thus, the first and second disk supporting levers 132, 133 take a basic position.

When the cam 74 is rotated, the sliding plate is slidingly moved. When a boundary portion between the sixth and seventh cam surfaces 138f, 138g of the cam plate 138 comes to the position of the second cam engaging pin 137, the sliding of the sliding plate 59 is stopped. The first and second disk supporting levers 132, 133 maintain the basic position.

Due to the sliding of the sliding plate 59 during this, the locking lever 52 of the locking mechanism 4 is rotated, and, as shown in FIG. 18, the rotating table 21 is locked by the table engaging portion 51. Furthermore, the distance of discs supported on the rotating table 21 is widened by the disk engaging portion 82 of the disk distance widening mechanism 5. By the operation of the rotation mechanism 101 due to the rotation of the cam 74 during the sliding plate 59 is stopped, the first and second loading levers 92, 93 are rotated, and, as shown in FIG. 19, the disk clamping portions 91, 91 are moved to the side of the loading start position.

Figure 20:
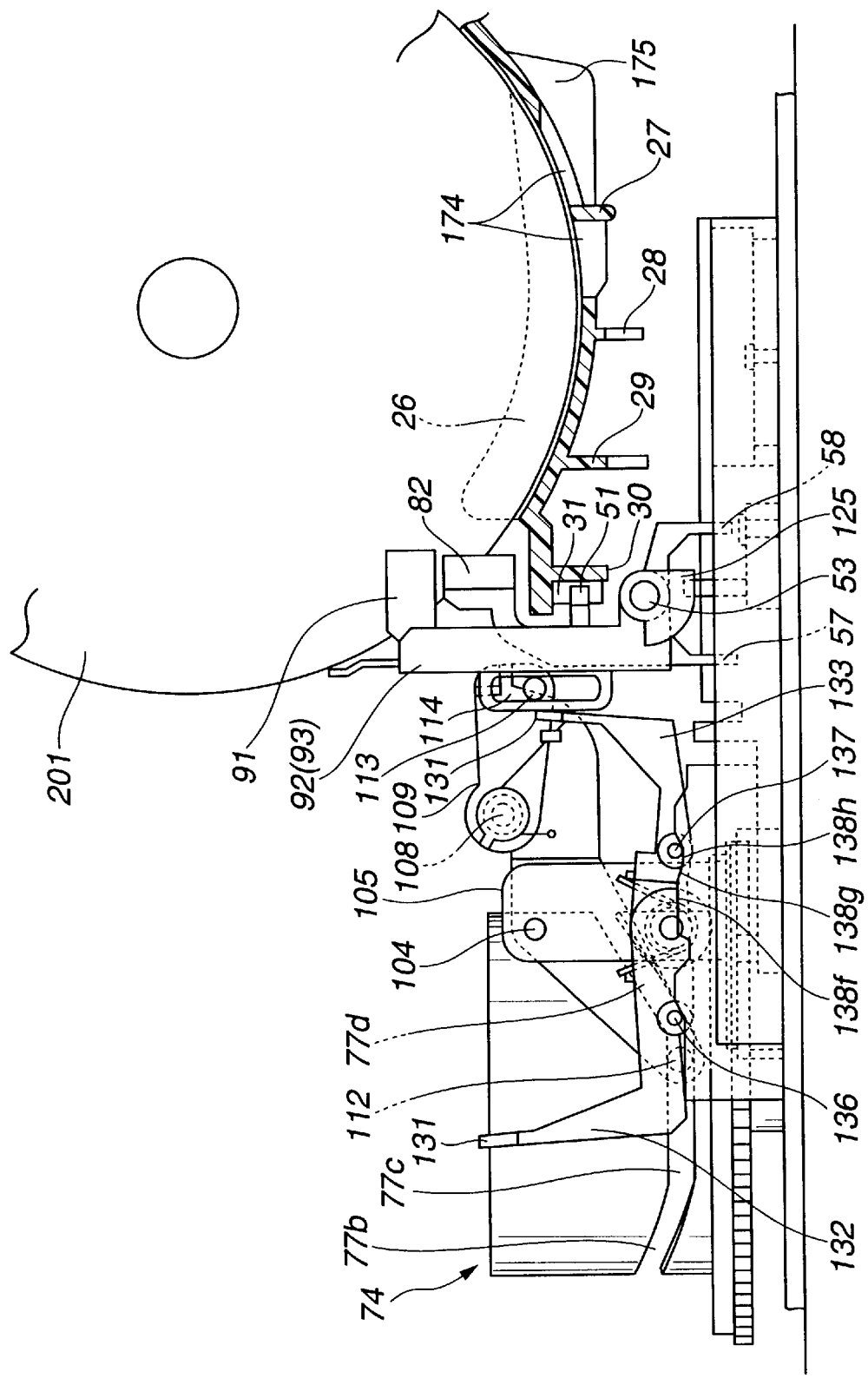
FIG. 20 is a side view of a condition in which a disk is clamped by the disk clamping portion.

When the movement of the disk clamping portions 91, 91 to the side of the loading start position is finished, the sliding plate 59 is again slidingly moved. As shown in FIG. 20, when the second cam engaging pin 137 is lowered on the seventh cam surface 138g and comes to the position of the eighth cam surface 138h, the sliding of the sliding plate 59 is again stopped. The second disk supporting lever 133 is slightly rotated by the downward movement of the second cam engaging pin 137 to the eighth cam surface 138h, and a pair of the disk clamping portions 91, 91 are closed by the operation of the opening and closing mechanisms 121, 122 of the loading mechanism 6, thereby clamping the disk 201.

The rotation mechanism 101 of the loading mechanism 6 is operated by the rotation of the cam 74 during the sliding plate 59 is stopped. Thus, the first and second loading levers 92, 93 are rotated in a condition in which the disk 201 is clamped by the disk portions 91, 91, and, as shown in FIG. 22, it is transported to the loading end position.

A pair of V-shaped disk supporting portions 131, 131 of the first and second disk supporting levers 132, 133 are positioned below the disk 201 transported to the loading end position.

When the transportation of the disk 201 by the loading mechanism 6 is finished, the sliding plate is again slidingly moved. As shown in FIG. 23, when the third cam surface 138c moves to the position of the first cam engaging pin 136 and when the tenth cam surface 138j moves to the position of the second cam engaging pin 137, the V-shaped disk supporting portions 131, 131 at ends of the first and second disk supporting levers 132, 133 are moved in a direction in which they get closer to the peripheral surface of the disk 201.

During the first and second cam engaging pins 136, 137 move on the third and tenth cam surfaces 138c, 138j, the opening and closing mechanisms 121, 122 of the loading mechanism 6 are operated. As shown in FIG. 24, a pair of the disk clamping portions 91, 91 are opened, and the clamped disk 201 is placed on the V-shaped disk supporting portions 131, 131 at the ends of the first and second disk supporting levers 132, 133.

Figure 25:
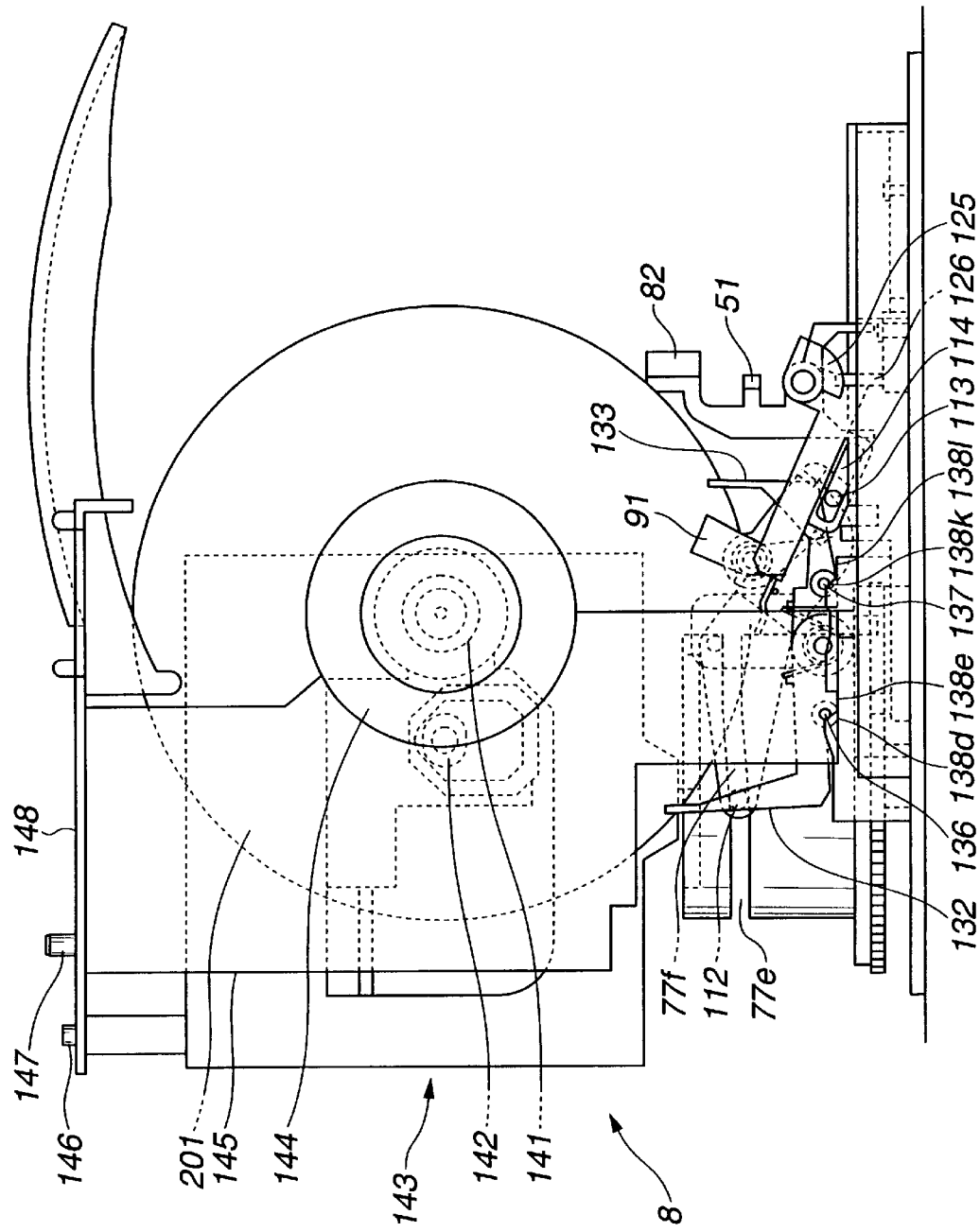
FIG. 25 is a side view of a condition in which the disk is in a chucking at a recording and playback portion.

The disk placed on the V-shaped disk supporting portions 131, 131 is, as shown in FIG. 25, subjected to a chucking by the recording and playback portion 8.

When the sliding plate 59 is further moved slidingly, as shown in FIG. 26, the first cam engaging pin 136 reaches the fifth cam surface 138e via the fourth cam surface 138d, and the second cam engaging pin 137 reaches the twelfth cam surface 138l via the eleventh cam surface 138k. As a result, these first and second disk supporting levers 132, 133 are rotated downward, and they are brought into a condition in which they are not in contact with the disk 201 clamped by the recording and playback portion 8.

(8) Construction of Recording and Playback Portion 8

Figure 27:
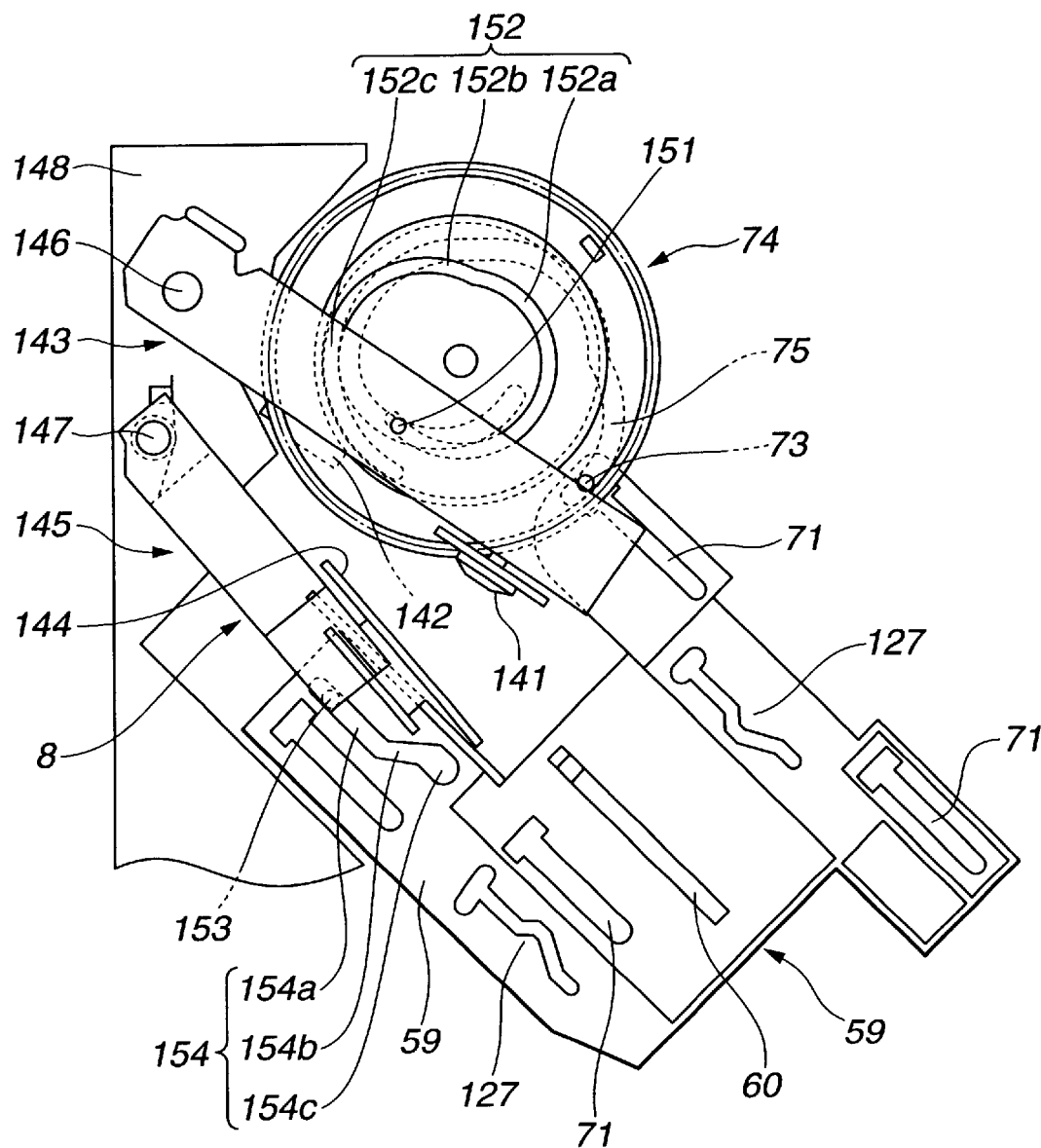
FIG. 27 is a plan view of the recording and playback portion before chucking.

The recording and playback portion 8 conducts chucking and optical recording or playback of the disk held by the disk holding mechanism 7. As shown in FIG. 27, it is equipped with a first frame portion 143 formed with a disk table 141 for rotating the disk, a light pickup device 142 for conducting recording or playback by irradiating the disk with light beam and the like, and a second frame portion 145 formed with a damper 144 for conducting chucking of the disk on the disk table 141.

The first and second frame portions 143, 145 are arranged in a manner to oppose the disk table 141 with the damper 144, and are rotatably respectively attached at their one end sides to a frame supporting body 148 by shafts 146, 147.

A first cam engaging pin 151 is formed on an upper portion on a free end side of the first frame 143, and the cam engaging pin 151 is engaged with a cam groove 152 formed on an upper surface of the cam 74.

A second cam engaging pin 153 is formed on a lower portion of a free end side of the second frame 145, and the cam engaging pin 153 is engaged with a cam groove 154 formed on the sliding plate 59.

Figure 16:
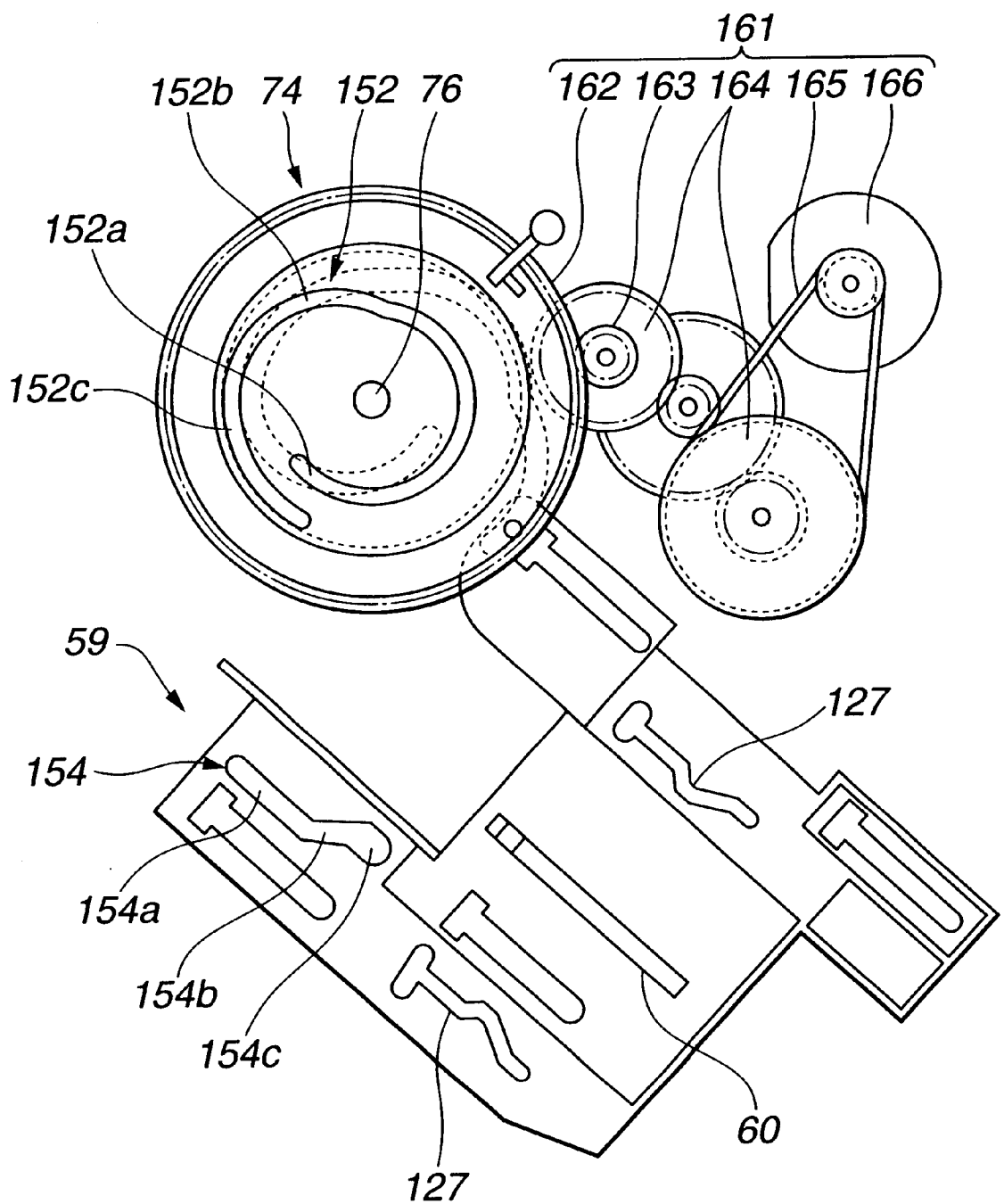
FIG. 16 is a plan view of the cam and the slide plate.

As shown in FIG. 16, the cam groove 152 of the upper surface of the cam 74 has a first groove portion 152a, a second groove portion 152b continuous with the first groove portion 152a, and a third groove portion 152c continuous with the second groove portion 152b.

The first groove portion 152a is concentrically formed about the rotation shaft 76 of the cam 74. During the first cam engaging pin 151 moves in the first groove portion 152a, the above first frame 143 does not rotate.

The second groove portion 152b is formed in a manner to gradually move away from the rotation shaft 76. The first frame 143 is rotated by the second groove portion 152b by a predetermined angle toward the second frame 145 about the shaft 146.

The third groove portion 152c is concentrically formed about the rotation shaft 76. During the first cam engaging pin 151 moves in the third groove portion 152c, the first frame 143 is maintained in a condition in which it has been rotated at a predetermined angle.

The cam groove 154 formed on the sliding plate 59 is equipped with a first groove portion 154a, a second groove portion 154b continuous with the first groove portion 154a, and a third groove portion 154c continuous with the second groove portion 154b.

The first groove portion 154a is formed in parallel with the sliding direction of the sliding plate 59. During the second cam engaging pin 153 moves in the groove portion 154a, the second frame 145 is not rotated.

The second groove portion 154b is formed in a manner to be inclined toward an inner side of the sliding plate 59, and the second frame 145 is rotated toward the first frame 143.

The third groove portion 154c is formed in parallel with the sliding direction of the sliding plate 59, and the second frame 145, which has been rotated by the second groove portion 154b, is maintained in a rotated condition.

In the recording and playback portion 8, when the disk is transported to the loading end position by the loading mechanism 6, the first frame 143 starts to rotate toward the second frame 145 by the second groove portion 152b of the cam groove 152 formed on the upper surface of the cam 74.

Figure 28:
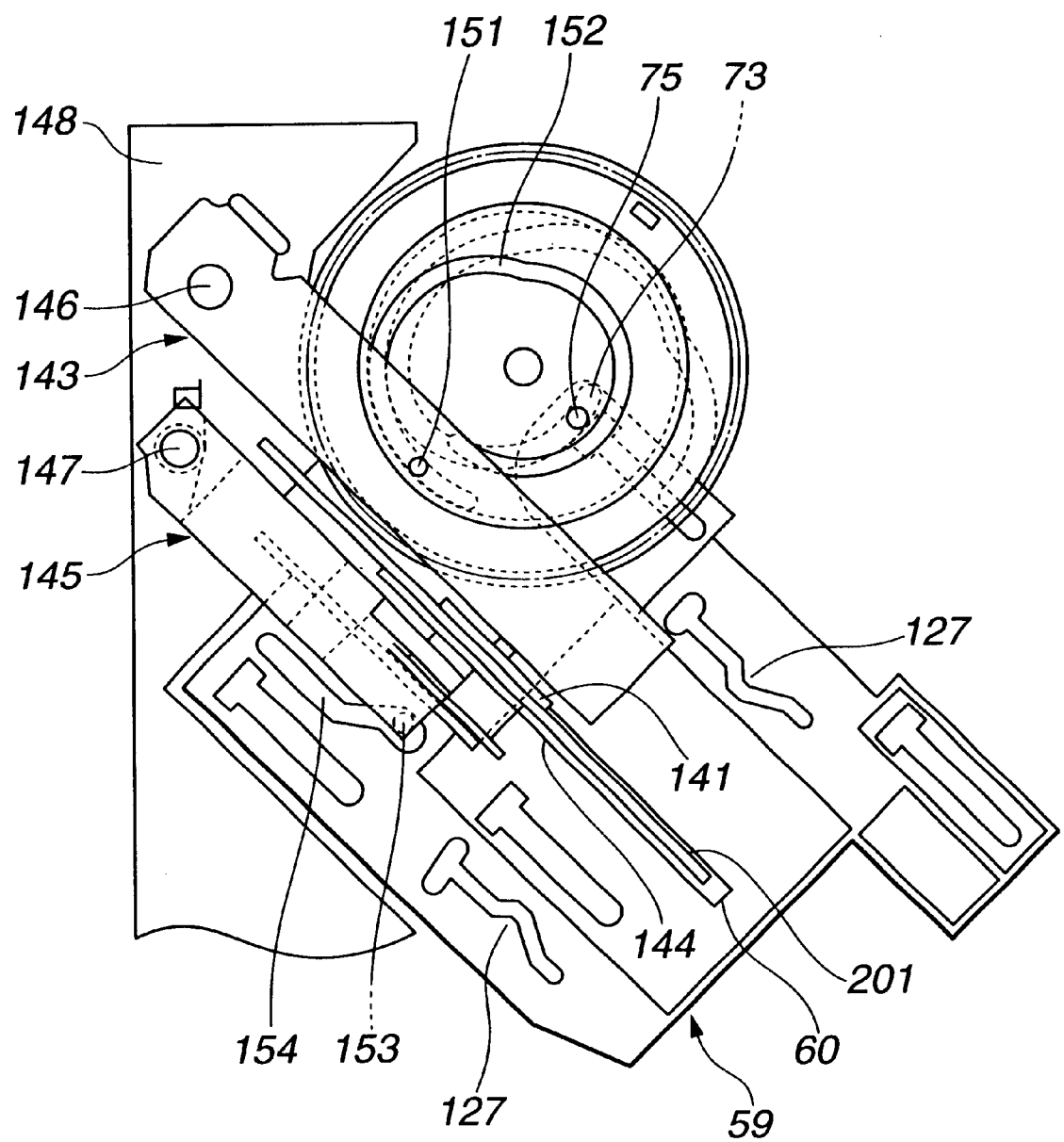
FIG. 28 is a plan view of the recording and playback portion after chucking.

When the first frame 143 rotates by a predetermined angle, the second frame 145 starts to rotate toward the first frame 143 by the second groove portion 154b of the cam groove 154 formed on the sliding plate 59. When the first and second frames 143, 145 rotate by respective predetermined angles, the damper 144 is, as shown in FIG. 28, attracted magnetically, and the disk is subjected to a chucking on the disk table 141.

During a time in which the first frame 143 starts to rotate and results in chucking, the disk holding mechanism 7 works. Thus, the V-shaped disk supporting portions 131, 131 at the ends of the first and second disk supporting levers 132, 133 get closer to the periphery of the disk 201 and take a disk holding position. Furthermore, the disk clamping portions 91, 91 of the loading mechanism 6 open, and the disk 201 is in a condition in which it is placed on the V-shaped disk supporting portions 131, 131 of the first and second disk supporting levers 132, 133. That is, the disk clamping by the disk clamping portions 91, 91 of the loading mechanism 6 is canceled, and it is subjected to a chucking on the disk table 141 by the damper 144 in a condition in which it is placed on the disk supporting portions 131, 131 of the disk holding mechanism 7.

After chucking of the disk 201 to the disk table 141, the disk clamping portions 91, 91 of the loading mechanism 6 and the disk supporting portions 131, 131 of the disk holding mechanism 8 lower until it becomes possible to maintain a condition in which they are not in contact with the disk.

In FIG. 16, a supporting symbol 161 is a cam rotating mechanism for rotating the cam 74. The cam rotating mechanism 161 is equipped with a cam driving gear 163, which meshes with gear teeth 162 formed on a peripheral surface of a lower end of the cam 74, a gear train 164, a driving belt 165, and a motor 166.

The cam 74 is rotated by rotating the cam driving gear 163 by the motor 166 through the driving belt 165 and the gear train 164.

The motor 166 is a motor that is rotatable in one and the other directions, which is capable of rotating the cam 74 in the clockwise and counterclockwise directions.

(9) Construction of Disk Detecting Mechanism 9

The disk detecting mechanism 9 is one for detecting whether or not a disk is supported on the disk supporting portion 22 of a desired address among the first to 300th addresses of the rotating table 21.

Figure 29:
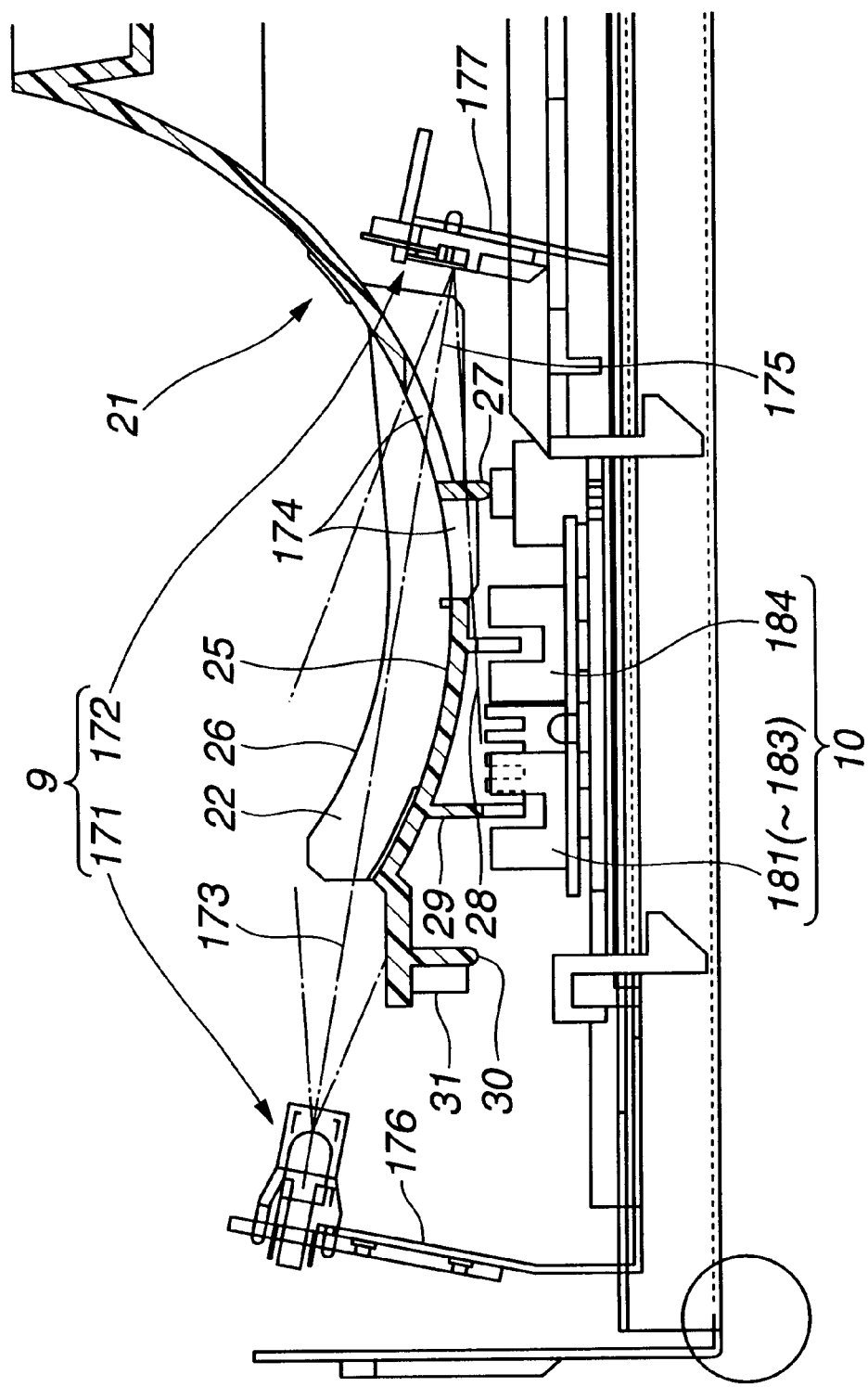
FIG. 29 is a sectional view showing a mechanism for detecting the existence of a disk and an address detecting mechanism portion.
Figure 30:
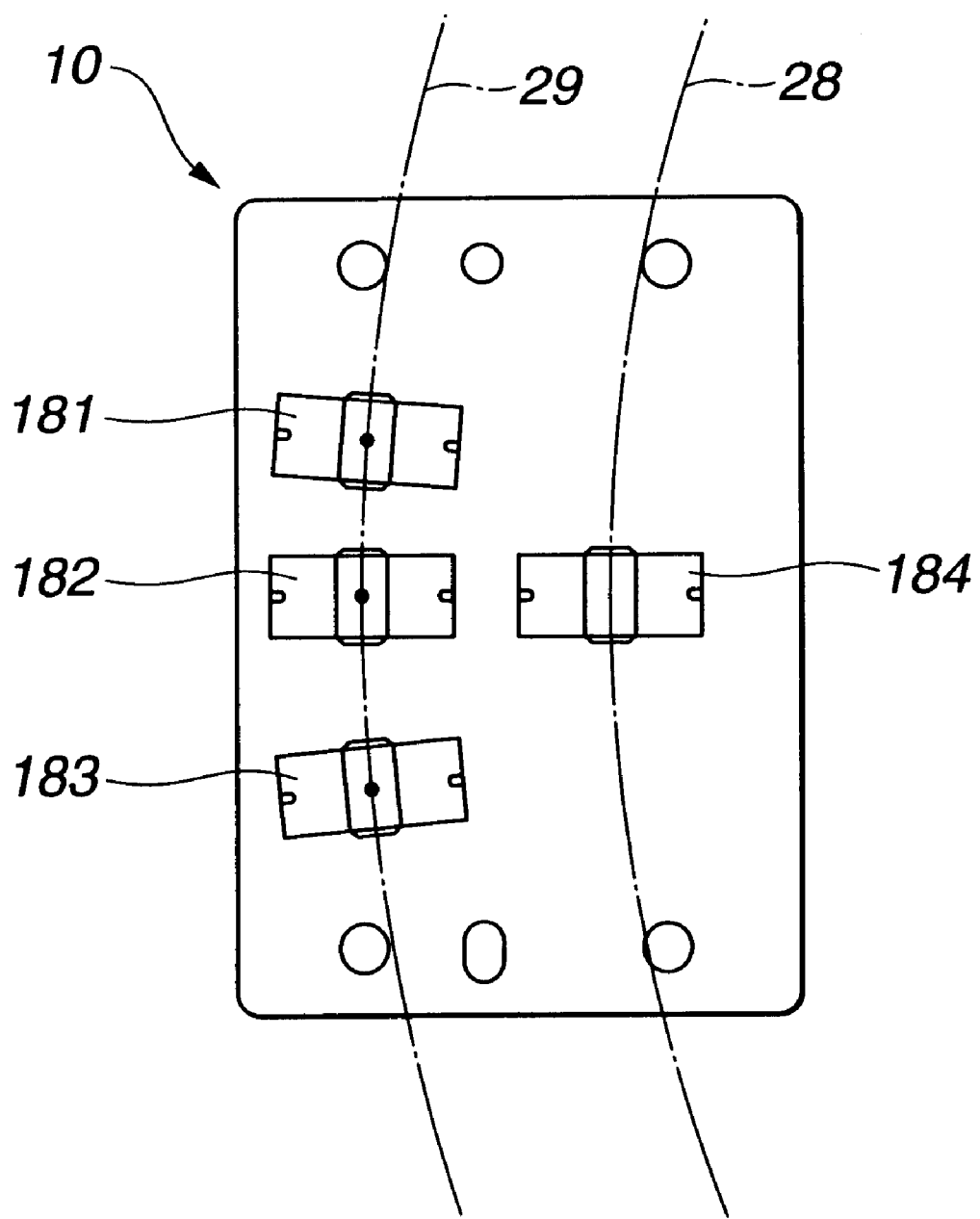
FIG. 30 is a plan view of the mechanism for detecting an address.

As shown in FIG. 29, the disk detecting mechanism 9 is constituted of a photosensor comprising a light generating portion 171 and a light receiving portion 172.

The light generating portion 171 is arranged outside of the rotating table 21. A detecting light 173, emitted from the light generating portion 171, reaches the light receiving portion 172 via between the ribs 26, 26 constituting the disk supporting portion 22 of the rotating table 21 and via cutout portions 174 formed on the arcuate surface 25 of the rotating table 21.

When the disk 201 is supported on the disk supporting portion 22, the detecting light 173 emitted from the light generating portion 171 is blocked by the disk 201 and does not reach the light receiving portion 172. With this, it is detected that the disk is supported on the disk supporting portion 22.

Furthermore, a detecting light diffusion preventing rib 175 is formed on a lower surface of the rotating table 21 for preventing diffusion of the detecting light 173, which has passed cutout portions 174, until it reaches the light receiving portion 172. The light generating portion 171 and the light generating portion 172 are respectively attached onto the chassis 11 by a light generating portion holder 176 and a light receiving holder 177 in a manner that their positions are adjustable.

(10) Construction of Address Detecting Mechanism 10

The address detecting mechanism 10 is equipped with first to third photosensors 181, 182, 183 that detect minor address slits 29a . . . 29a formed on the third annular projection 29 on the bottom surface of the rotating table 21, and a fourth photosensor 184 that detects first to tenth major addresses slits 28*a*–28*j* formed on the second annular projection 28.

The first to third photosensors 181–183 are arranged to have a phase in a rotation direction of the third annular projection 29.

Figure 31:
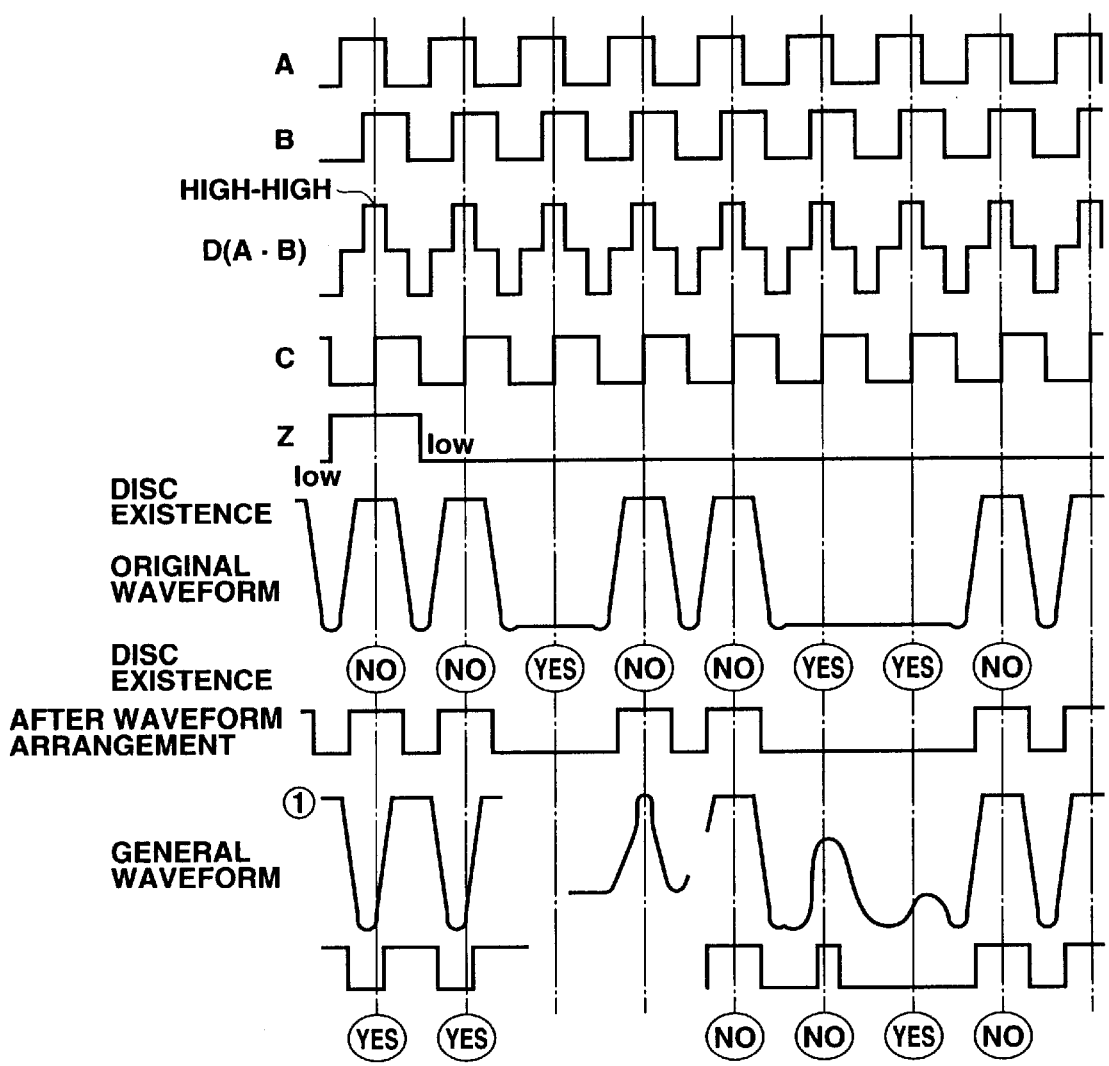
FIG. 31 is a waveform graph of an output from the address detecting mechanism.

FIG. 31 shows waveform graphs of minor address slits and major address slits detected by the first to fourth photosensors 181–184.

In FIG. 31, the waveform detected by the first photosensor 181 is A, the waveform detected by the second photosensor 182 is B, and the waveform detected by the third photosensor 183 is C.

The waveform obtained by combining the waveforms A and B detected by the first and second photosensors 181, 182 is D (A+B), and the rotating table 21 is stopped in a manner to be within a range of "High-High" of the waveform D.

The waveform Z is a waveform of the first slit 28*a* for the major addresses, detected by the fourth photosensor 184. When one "High-High" exists between "Low" and "Low" of the waveform Z, for example, a region of the first to 30th addresses is detected as the first major address. When two of "High-High" exist between "Low" and "Low" of the waveform Z, a region of the 31st to 60th addresses is detected as the second major address. In this way, each region is sequentially detected until a region of 271st to 300th addresses of the 10th major address.

By detecting both of the major and minor addresses, a disk supported on the disk supporting portion 22 . . . 22 of a desired address is conveyed to the position of the loading mechanism. As shown in FIG. 31, in case that the waveform detected by the disk detecting mechanism 9 has a positional difference, the difference of the waveform is corrected by adjusting the position of the light generating portion 171 and/or the light receiving portion 172 constituting the disk detecting mechanism. The false detection caused by the detecting light leak from adjacent disk supporting portions 22 . . . 22 is controlled by the detecting light diffusion preventing ribs 175 . . . 175 formed on the lower surface of the rotating table 21, as mentioned above.

(11) Construction of Disk Ejecting Mechanism 19

Figure 32:
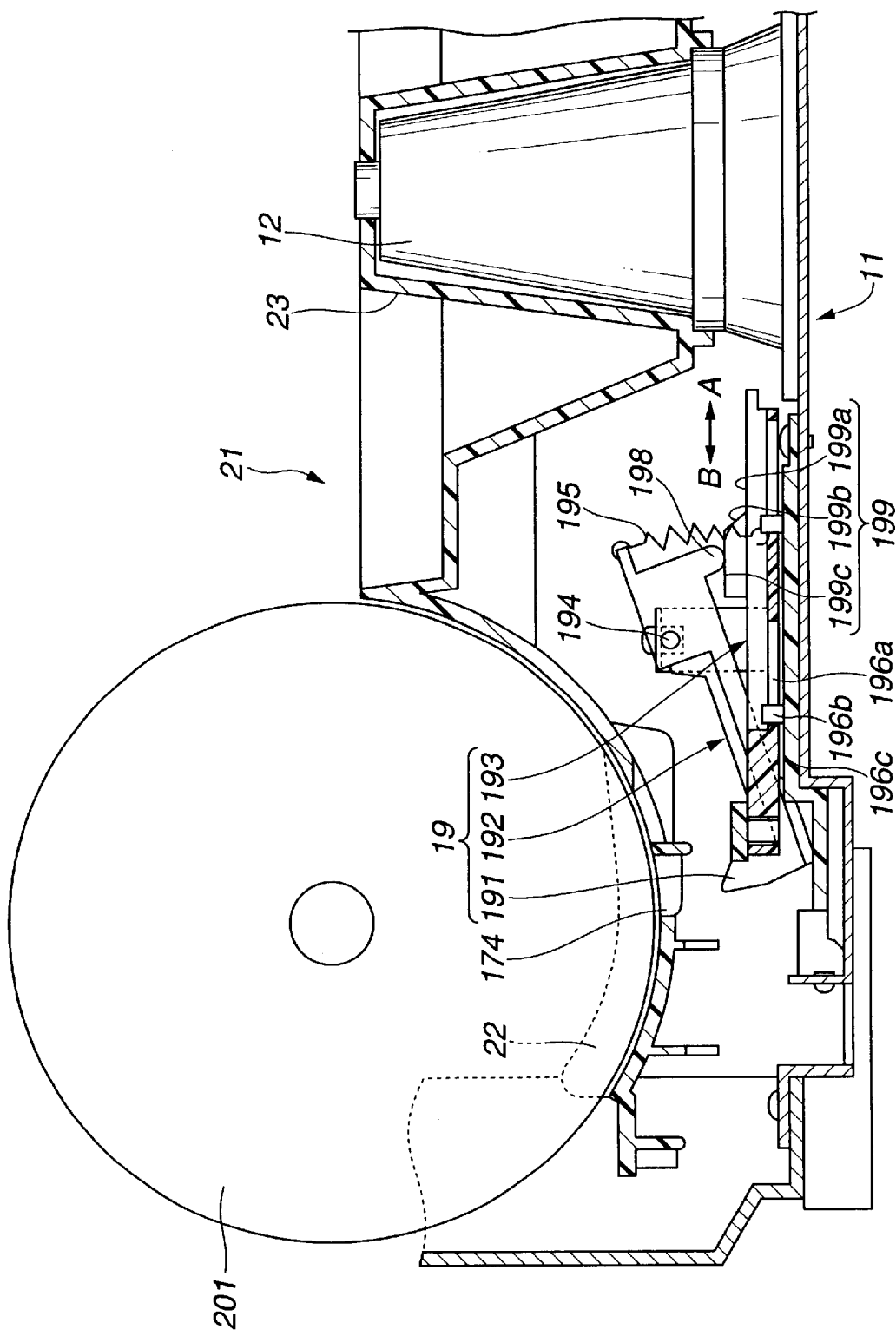
FIG. 32 is a sectional view of a disk ejecting mechanism before ejection.
Figure 33:
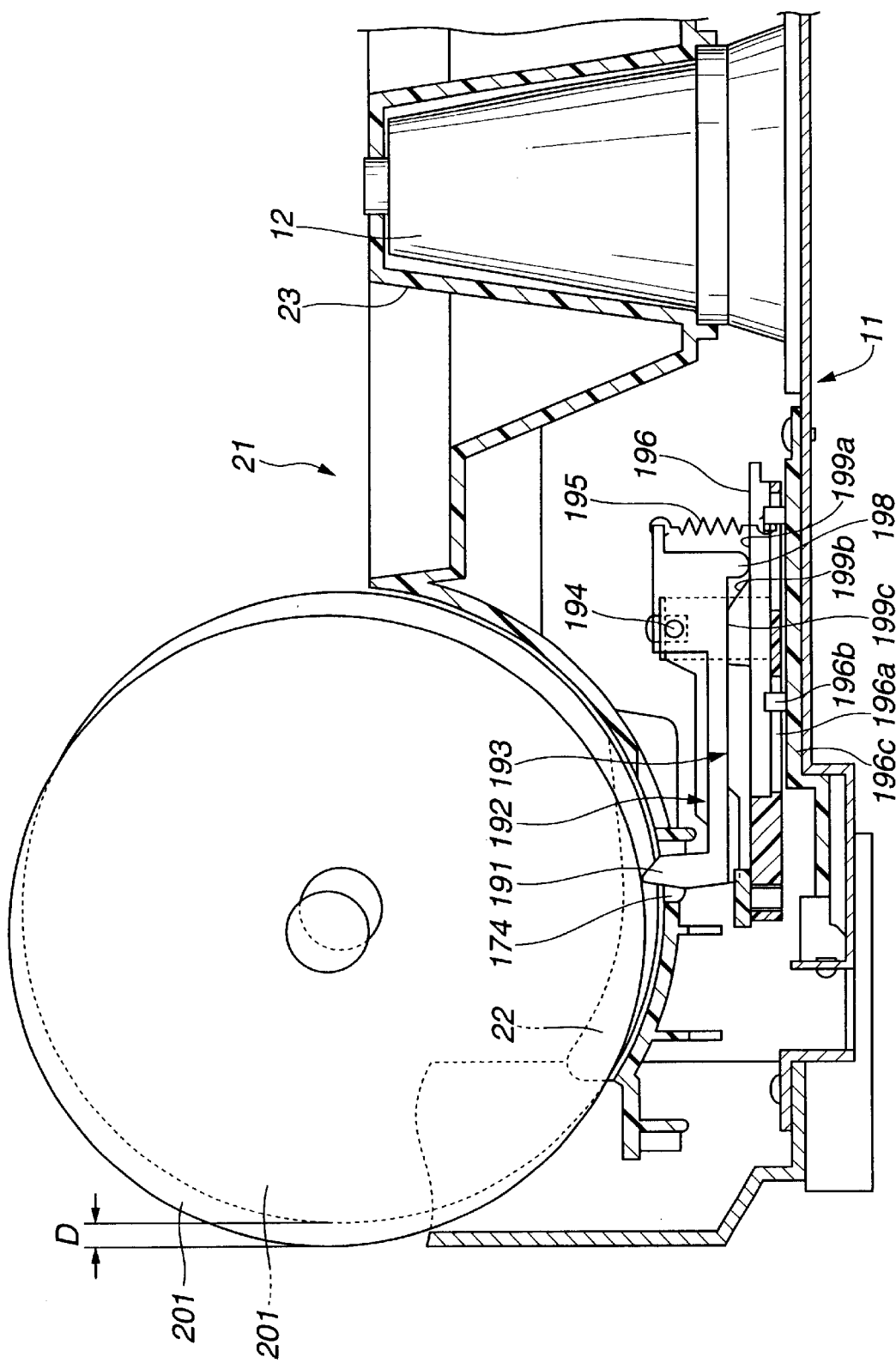
FIG. 33 is a section view of the disk ejecting mechanism after ejection.
Figure 34:
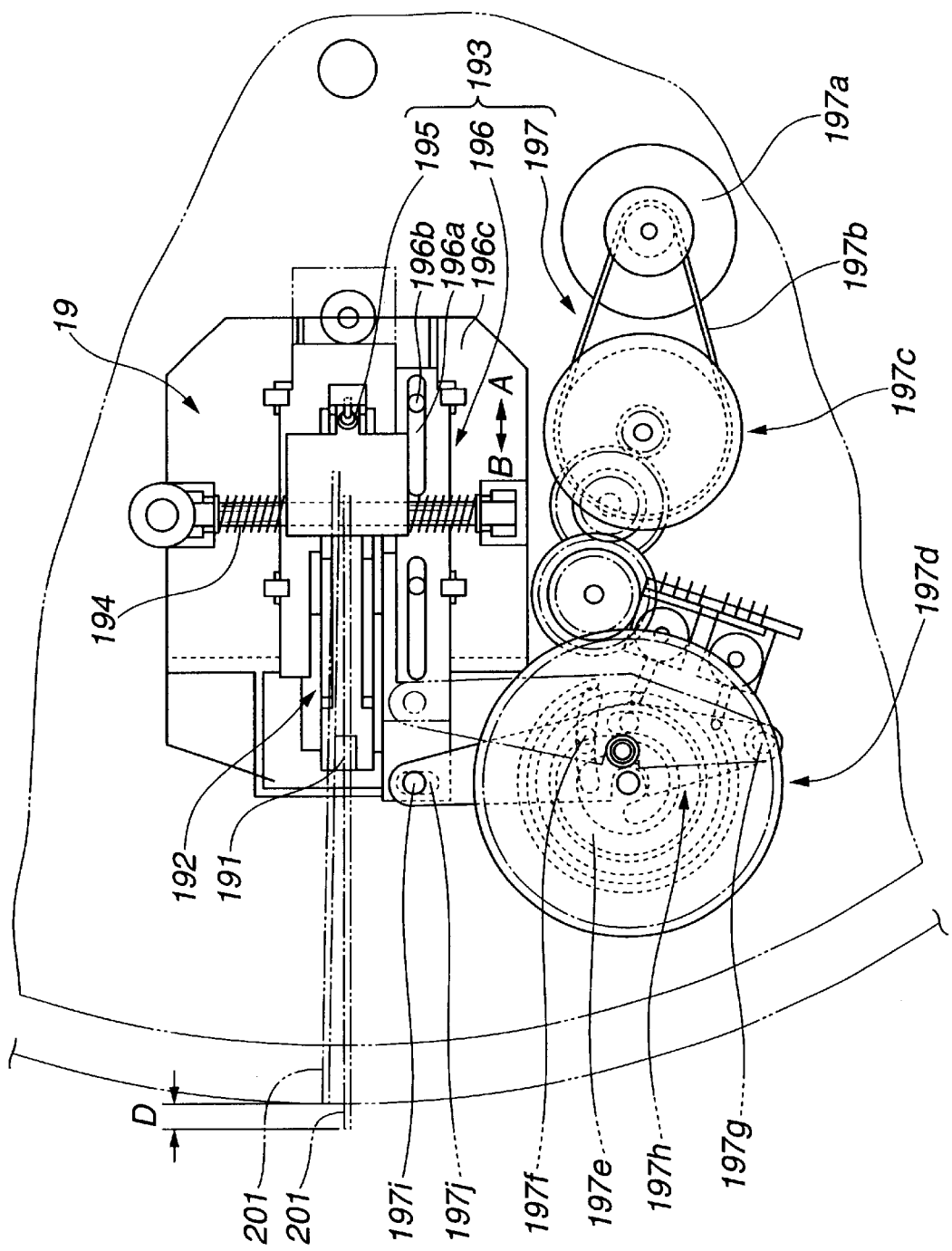
FIG. 34 is a plan view of the disk ejecting mechanism after ejection.

As shown in FIGS. 32–34, the disk ejecting mechanism 19 is disposed on the chassis 11 below the rotating table 21. A projection portion 191 for pressing disk goes into the disk supporting portion 22 through the cutout portion 174 formed on the bottom surface of each of the disk supporting portions 22 . . . 22, slightly raises an inner side that is inside of the lowest portion of the disk 201 in the supporting portion 22, and makes the disk 201 project outside of the disks 201 on its both sides.

The disk ejecting mechanism 19 is equipped with an ejecting lever 192 having the projection portion 191 on a disk pressing side, which goes into the supporting portion through the cutout portion 174 formed on the bottom portion of the disk supporting portion 22 and ejects the disk 201, and with an ejecting lever operating portion 193 that operates the ejecting lever 192 in a manner to make the projection 191 for pressing disk go into and out of the supporting portion 22.

The ejecting lever 192 has the projection portion 191 on its one end side, and the other end side is rotatably supported by a shaft 194. The projection portion 191 goes into the supporting portion 22 by rotating the ejecting lever 192 in one direction about the shaft 194 by the ejecting lever operating portion 193, and the projection portion 191 goes out of the supporting portion 22 and the cutout portion 174 by rotating it in the other direction.

As shown in FIG. 34, the ejecting lever operating portion 193 is equipped with a biasing member 195 providing the ejecting lever 192 with a rotational force in a direction in which the projection portion 191 goes into the supporting portion 22, a sliding lever 196 that rotates the ejecting lever 192 in opposition to the biasing force of the biasing member 195 in a direction in which the projection portion 191 goes out of the supporting portion 22 and the cutout portion 174, and a sliding lever driving mechanism 197 that makes the sliding lever 196 slide.

The sliding lever 196 is fixed on a base plate 196*c* in a manner to be slidable in a direction of arrows A and B, by a slide guiding elongate hole 196*a* and a guiding pin 196*b*.

The sliding lever driving mechanism 197 is equipped with a motor 197*a*, a belt 197*b* that is driven by the motor 197*a*, a gear train 197*c* that is driven by the belt 197*b*, a cam 197*d* that is rotated by the gear train 197*c*, and a rotating lever 197*h* that rotates by the rotation of the cam 197*d* with a fulcrum of the shaft 197*g*, in which a cam engaging pin 197*f* is inserted into a cam groove formed on an upper surface of the cam 197*d*.

An end of the rotating lever 197*h* is connected to the sliding lever 196 through a pin 197*i* and an elongate hole 197*j*.

The sliding lever 196 is made to slide in a direction of arrows of A and B.

As shown in FIG. 32, the sliding lever 196 has a cam 199 against which a cam abutting portion 198 formed on one end portion of the ejecting lever 19 is pressed by the biasing force of the biasing member 195.

The cam 199 has a horizontal first cam surface 199*a*, an up-graded second cam surface 199*b* continuous with the first cam surface, and a horizontal third cam surface 199*c* continuous with an upper end of the second cam surface.

As shown in FIG. 32, in a condition in which the cam has slidingly moved farthest in the direction of the arrow A, the cam abutting portion 198 is positioned on the third cam surface 199*c*, and the projection portion 191 of the ejecting lever 192 goes out of the supporting portion 22 and the cutout portion 174 and is in a condition in which it is not in contact with the rotating table 21.

When the sliding lever 196 slides in the direction of the arrow B, the ejecting lever 192 rotates by the second cam surface 199*b*, in opposition to the biasing force of the biasing member 195, in a direction in which the projection portion 191 goes up.

When the sliding lever 196 further moves slidingly in the direction of the arrow B and, as shown in FIG. 33, the cam abutting portion 198 moves to a position at which it abuts against the first cam surface 199*a*, the projection portion 191 goes into the supporting portion 22 and raises the lower end of the disk 201 supported in the supporting portion 22, thereby projecting the disk 201 outside of other disks and making this easy to be taken out.

In a condition in which the cam abutting portion 198 rides on the third cam surface 199*c*, the sliding lever 196 is provided with a sliding force by the biasing member 195 in the direction toward the arrow A, and one end side of the elongate hole 196*a* is pressed against the guiding pin 196*b* of the base plate 196*c*. With this, the projection portion 191 is maintained in a condition in which it has gone out of the supporting portion 22 and the cutout portion 174.

The driving of the disk ejecting mechanism 19 is controlled by a controlling portion not shown in the drawings.

The amount of projection of the disk by the disk ejecting mechanism 19 shown in FIG. 33 can be adjusted by changing the height of the projection portion 191, which goes into the supporting portion 22.

(12) Operation

Figure 35:
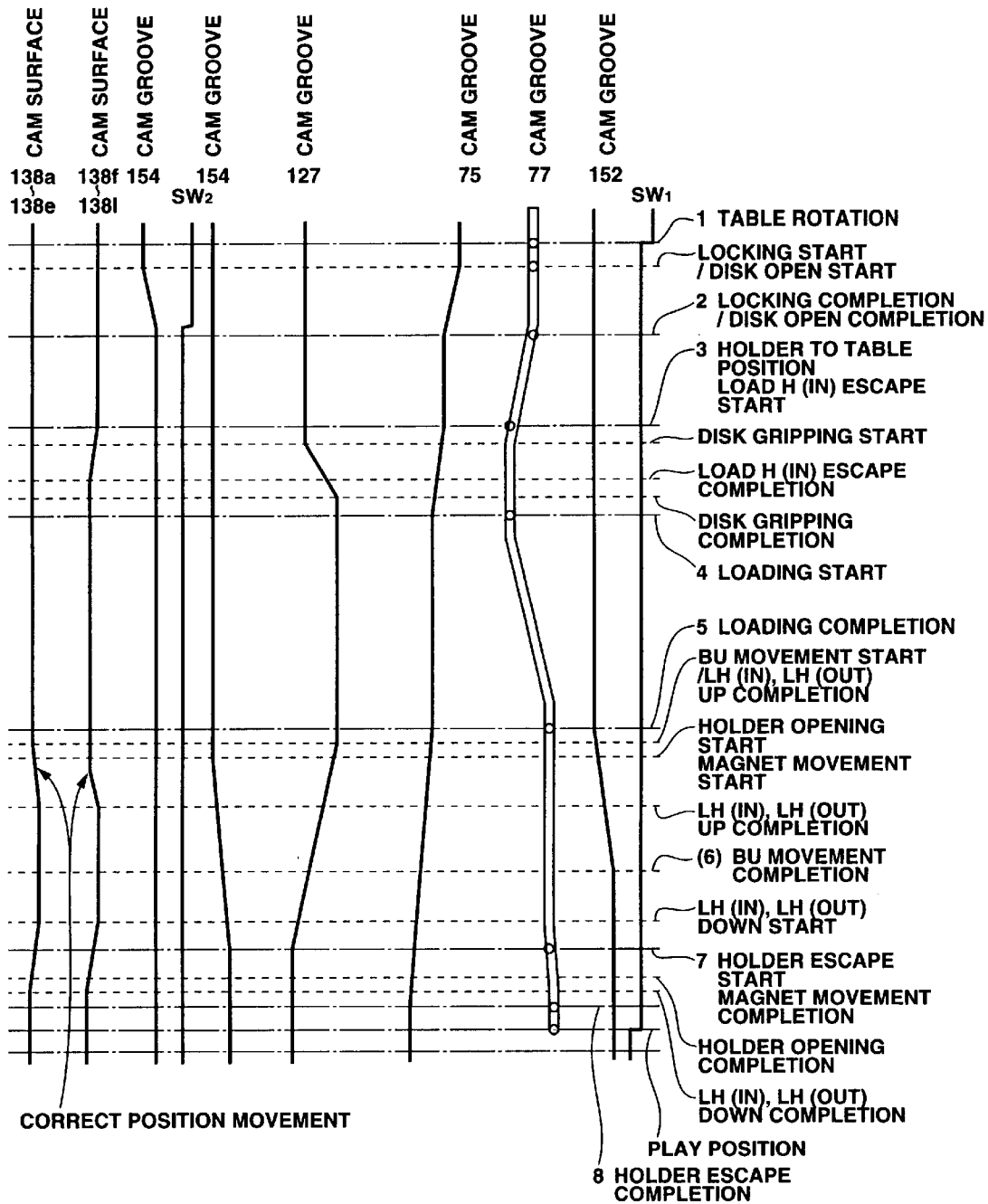
FIG. 35 is a cam line graph used for the description of operation of the recording and playback apparatus.

FIG. 35 shows cam lines showing relations of cam grooves 75, 77, 152 formed on the bottom surface, the peripheral surface and the upper surface of the cam 74 and of cam grooves 127, 154 and the cam surface 138, formed on the sliding plate 59, and the like.

In a condition in which the cam engaging pin 73 is positioned in the first groove portion 75a of the cam groove 75 formed on the bottom surface of the cam 74 and in which the cam engaging pin 112 of the rotating mechanism 101 of the loading mechanism is positioned in the first groove 77a of the cam groove 77 formed on the peripheral surface, it is in the waiting condition shown in FIG. 17.

In case that recording or playback is conducted, it is switched to a recording and playback mode by operating a switch of a controlling panel not shown in the drawings, then a desired address is input, and then a switch SWI is switched on. With this, the rotating table 21 rotates, and the disk detecting mechanism 9 detects whether or not a disk is supported at a desired address. Furthermore, when the disk supporting portion 22 of the address detected by the address detecting mechanism 10 comes to the position of the loading mechanism 6, the rotation of the rotating table 21 stops.

When the sliding plate 59 slides in the direction of the arrow B of FIG. 10 by the rotation of the cam 74, the locking lever 52 of the locking mechanism 4 rotates in the locking direction by the locking lever supporting portion 60 formed on the sliding plate 59, and the table engaging portion 51 engages with the gear teeth 31 . . . 31 of the rotating table 21, as shown in FIG. 18, thereby locking the rotating table 21 unrotatably. Furthermore, the disk engaging portion 82 of the disk distance widening mechanism 5 widens the distance between disks positioned on the both sides of the disk 201 of the desired address, and then the sliding plate 59 stops.

The rotating mechanism 101 of the locking mechanism 6 works by the rotation of the cam 74 during the sliding plate 59 stops. With this, as shown in FIG. 19, the first and second loading levers 92, 93 rotate, and the disk clamping portions 91, 91 on their ends moves to the position of the desired disk 201 supported on the disk supporting portion 22 of the rotating table 21, that is, the loading start position. With this, the desired disk 201 is introduced between the disk clamping portions 91, 91.

Figure 21:
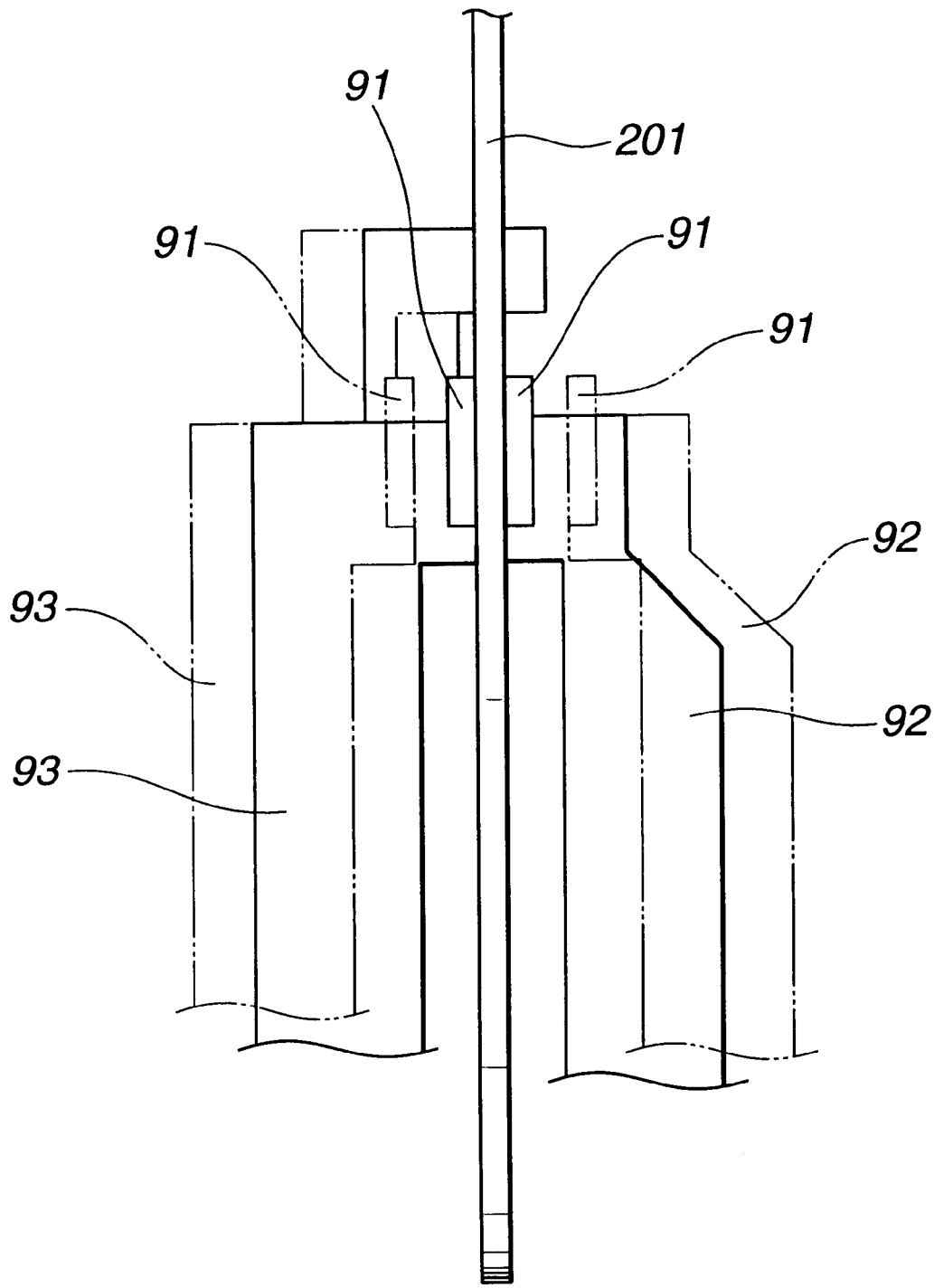
FIG. 21 is a front view of a condition in which the disk is clamped by the disk clamping portion.

Next, the sliding plate slides again, and, as shown in FIG. 20, the rotating table 21 is locked by the locking mechanism 4. In a condition in which the distance between disks supported on the rotating table 21 has been widened, the opening and closing mechanism 121, 122 of the loading mechanism 6 works, and as shown in FIG. 21, a pair of the disk clamping portions 91, 91 are closed. Thus, the desired disk 201 is clamped, and the sliding of the sliding plate 59 stops.

During the sliding plate 59 stops, the rotating mechanism 101 of the loading mechanism 6 works. As shown in FIG. 22, the first and second loading levers 92, 93 rotate and transport the disk 201 clamped by the clamping portions 91, 91 to the loading end position.

One end side of the disk 201 transported to the loading end position is in a condition in which it is inserted between the both side disks on the rotating table 21. However, it is not in contact with the both side disks by the disk engaging portion 82 of the disk distance widening mechanism 5, and it is not in contact with the disk engaging portion 82, either.

As mentioned above, when the desired disk 201 is conveyed to the loading end position, the sliding plate 59 starts sliding again. Thus, as shown in FIG. 23, the disk supporting levers 132, 133 of the disk holding mechanism 7 rotate in a direction in which they stand up, and the V-shaped disk supporting portions 131, 131 formed on the ends of these disk supporting levers 132, 133 get close to the peripheral portion of the lower end side of the disk 201 positioned at the loading end position. Furthermore, the first frame portion 143 and the second frame portion 145 of the recording and playback portion 8 start getting close to each other.

When the first and second frame portions 143, 145 get close to a predetermined position, the opening and closing mechanism 121, 122 of the loading mechanism 6 works. Thus, as shown in FIG. 24, the disk clamping portions 91, 91 open, thereby canceling the clamping of the disk 201.

The disk 201, of which clamping by the clamping portions 91, 91 has been canceled, falls on a pair of V-shaped disk supporting portions 131, 131 of the disk holding mechanism 7, and thereby is placed on these disk supporting portions 131, 131.

When the first and second frame portions 143, 145 of the recording and playback portion 8 get close further, the damper 144 is magnetically attracted to the disk table 141, and, as shown in FIG. 25, the disk 201 is subjected to chucking on the disk table 141.

When the disk 201 is subjected to chucking by the recording and playback portion 8, as shown in FIG. 26, the first and second supporting levers 132, 133 of the disk holding mechanism 7 rotate in a manner to lower toward the outside of the rotating table 21 and are brought into a condition in which they are not in contact with the disk 201. Furthermore, while the first and second loading levers 92, 92 of the loading mechanism 6 open the disk clamping portions 91, 91, they rotate in a direction to separate from the disk 201. Thus, the disk 201 rotates in a condition in which it is not in contact with the disk distance widening mechanism 5, the loading mechanism 6 and the disk holding mechanism 7, and the recording and/or the playback of the disk 201 is conducted by the recording and playback portion 8.

After the recording and playback, when the cam 74 is reversed, the disk 201 is returned toward the side of the rotating table 21 by the reverse of the operation upon the loading, and the locking mechanism 4, the disk distance widening mechanism 5, the locking mechanism 6, the disk holding mechanism 7 and the like are returned to the waiting positions shown in FIG. 17. In case of taking out a disk of a desired address, a switch of the controlling panel not shown in the drawings is operated to switch it to a disk taking-out mode. Then, a desired address is input, and an ejection start button is pushed. With this, the rotating table 21 rotates, and the disk supporting portion 22 of the desired address detected by the address detecting mechanism comes to a position almost right above the disk ejecting mechanism 19. Upon this, the rotation of the rotating table 21 is stopped, and it is locked.

The sliding lever driving mechanism 197 of the disk ejection mechanism 19 works, and the sliding lever 196 slides. Thus, the ejecting lever 192 rotates by the biasing force of the biasing member 195, and the projection portion 191 goes into the supporting portion 22 and raises the lower end of the disk 201. With this, as shown in FIG. 33, the disk 201 is taken outside of other disks supported on the rotating table 21, thereby making it easy to be taken out.

The disk 201 is taken out, and according to need a new disk is introduced into the supporting portion 22. After that, the sliding lever driving mechanism 147 works again by pushing an ejection end button. With this, the sliding lever 196 is moved slidingly in a direction opposite to the ejecting direction, and the ejecting lever 192 is rotated in opposition to the biasing force of the biasing member 195, thereby locking the projection portion 191 in a condition in which it is outside of the supporting portion 22 and the cutout portion 174.

(13) Modified Example

In the above-mentioned embodiment, the projection portion 191 formed on the end of the lever 192 is inserted into the supporting portion 22 by rotating the ejecting lever 192 of the disk ejecting mechanism 19. It is, however, not always necessary to rotate the ejecting lever 192. It is optional to provide a construction in which the projection portion 191 formed on its end is inserted into the supporting portion 22 by a rectilinear movement. The lever operating portion 193 is not limited to the above-mentioned embodiment so long as it can operate the ejecting lever 192 assuredly and easily with a simple construction.

(14) Advantageous Effects of the Invention

1. A recording and/or playback apparatus of a dislike recording medium according claim 1 comprises a receiving portion in which a plurality of supporting portions supporting respective peripheral ends of a plurality of disklike recording media are formed in an annular form and in which an opening portion (a cutout 174 in the specification) is formed on the supporting portion; a recording and/or playback means for conducting recording and/or playback of the disklike recording media; an ejecting operation means (an ejecting mechanism in the specification) that penetrates from the opening portion of the receiving portion and ejects a desired disklike recording medium out of the disklike recording media, from the supporting portion; a loading means (a loading mechanism in the specification) that takes out the desired disklike recording medium, which has been ejected from the supporting portion by the ejecting operation means, from the receiving portion and loads the desired disklike recording medium onto the recording and/or playback means; and a positioning means (a conveyance means in the specification) that rotates the receiving portion and makes the desired disklike recording medium and the loading means oppose to each other. Therefore, it is possible to load the desired disklike recording medium, which has been ejected from the supporting portion by the ejecting operation means, onto the recording and/or playback means, at a position at which the desired disklike recording medium is opposed to the loading means by the positioning means.

2. In the recording and/or playback apparatus of a disklike recording medium of claim 1, according to a recording and/or playback apparatus of a disklike recording medium of claim 2, the ejecting operation means comprises an ejecting lever that moves between a position, at which it projects into the supporting portion through the opening portion, and a position, at which it is separated from the receiving portion, and moves to the projecting position, thereby ejecting the disklike recording medium supported on the supporting portion. Therefore, it is possible to assuredly eject the disklike recording medium from the supporting portion by the ejecting lever at the projecting position.

3. In the recording and/or playback apparatus of a disklike recording medium of claim 2, according to a recording and/or playback apparatus of a disklike recording medium of claim 3, the ejecting lever is formed on its one end side with a projection portion that goes into the supporting portion through the opening portion, and the ejecting lever is formed to be rotatable between the projecting position and the separated position. Therefore, it is possible to eject the disklike recording medium from the supporting portion by an operation, in which the projection portion goes into the supporting portion, after the ejecting lever rotates.

4. In the recording and/or playback apparatus of a disklike recording medium of claim 3, according to a recording and/or playback apparatus of a disklike recording medium of claim 4, the ejecting operation means comprises an operation mechanism that operates the ejecting lever to rotate between the projecting position and the separated position. Therefore, it is possible to simply and easily move the ejecting lever between the projecting position and the separated position by the operation mechanism.

5. In the recording and/or playback apparatus of a disklike recording medium of claim 4, according to a recording and/or playback apparatus of a disklike recording medium of claim 5, the operation mechanism comprises an operating slider (a sliding lever 196 in the specification) that operates the ejecting lever to rotate between the projecting position and the separated position, and a driving mechanism (a sliding lever driving mechanism 197 in the specification) of the operating slider. Therefore, it is possible to move the ejecting lever between the projecting position and the separated position by a simple operation in which the operating slider is slidingly moved by the driving mechanism.

6. In the recording and/or playback apparatus of a disklike recording medium of claim 1, according to a recording and/or playback apparatus of a disklike recording medium of claim 6, the ejecting operation means is arranged on a lower surface side of the receiving portion. Therefore, it is possible to effectively eject the disklike recording medium from the lower surface side of the receiving portion.

7. In the recording and/or playback apparatus of a disklike recording medium of claim 1, according to a recording and/or playback apparatus of a disklike recording medium of claim 7, the loading means comprises a holding portion (loading levers 92, 93 in the specification) that holds the desired disklike recording medium ejected from the supporting portion by the ejecting operation means and that conveys the held, desired disklike recording medium to the recording and/or playback means. Therefore, it is possible to assuredly conduct loading by holding the disklike recording medium by the holding portion.

8. In the recording and/or playback apparatus of a disklike recording medium of claim 7, according to a recording and/or playback apparatus of a disklike recording medium of claim 8, the holding portion is formed to be rotatable between a first position for holding the desired disklike recording medium ejected from the supporting portion by the ejecting operation means and a second position for conveying the held, desired disklike recording medium to the recording and/or playback means. Therefore, it is possible to assuredly convey the disklike recording medium from the first position to the second position in a condition in which it is held by the holding portion.

9. In the recording and/or playback apparatus of a disklike recording medium of claim 7, according to a recording and/or playback apparatus of a disklike recording medium of claim 9, the holding portion is formed with a distance expanding operation portion (the reference sign 5 in the drawings) that widens a distance between the desired disklike recording medium ejected from the supporting portion by the ejecting operation means and another disklike recording medium received in the receiving portion. Therefore, it is possible to easily and assuredly hold the desired disklike recording medium by widening the distance between it and another disklike recording medium by the distance expanding operation portion.

10. In the recording and/or playback apparatus of a disklike recording medium of claim 7, according to a recording and/or playback apparatus of a disklike recording medium of claim 10, the loading means comprises a holding operation mechanism (grooves for opening and closing operations 127 and others in the specification) that makes the holding portion hold the desired disklike recording medium ejected from the supporting portion by the ejecting operation means and that cancels the holding of the desired disklike recording medium after the disklike recording medium is conveyed to the recording and/or playback means. Therefore, it is possible to conduct holding of the disklike recording medium by the holding portion and the holding cancellation, by the holding operation mechanism.

11. In the recording and/or playback apparatus of a disklike recording medium of claim 10, according to a recording and/or playback apparatus of a disklike recording medium of claim 11, the loading means comprises a retaining mechanism (a disk holding mechanism 7 in the specification) retaining the desired disklike recording medium which has been conveyed by the holding portion and of which holding by the holding portion has been canceled. Therefore, it is possible to retain the disklike recording medium, of which holding by the holding portion has been canceled, by the retaining mechanism.

12. In the recording and/or playback apparatus of a disklike recording medium of claim 11, according to a recording and/or playback apparatus of a disklike recording medium of claim 12, the holding mechanism comprises a retaining portion (supporting levers 132, 133 in the specification) that moves between a retaining position for retaining the desired disklike recording medium, of which holding by the holding portion has been canceled, and a non-retaining position at which it is separated from the disklike recording medium after the desired disklike recording medium has been installed on the recording and/or playback means. Therefore, delivery to the recording and/or playback means to the desired disklike recording medium is smoothly conducted by the retaining portion that moves between the retaining position and the non-retaining position.

13. In the recording and/or playback apparatus of a disklike recording medium of claim 1, according to a recording and/or playback apparatus of a disklike recording medium of claim 13, the positioning means comprises a locking lever (the reference sign 52 in the drawings) that limits the rotation of the receiving portion by engaging with the receiving portion. Therefore, it is possible to conduct an accurate positioning of the receiving portion by assuredly limiting the rotation of the receiving portion by the locking lever.

14. In the recording and/or playback apparatus of a disklike recording medium of claim 1, according to a recording and/or playback apparatus of a disklike recording medium of claim 14, the recording and/or playback means comprises a table that rotates the desired disklike recording medium loaded by at least the loading means, and a chucking member that chucks the desired disklike recording medium, together with the table. The apparatus further comprises a cam body (the reference sign 74 in the drawings) formed with a first cam groove (the reference sign 77 in the drawings) that drives the loading means, a second cam groove (the reference sign 75 in the drawings) that works the positioning means, and a third cam groove (the reference sign 152 in the drawings) for chucking of the desired disklike recording medium by the table and the chucking member. Therefore, it is possible to conduct the driving of the loading means and the chucking of the chucking member by the rotation of the cam body.

15. In the recording and/or playback apparatus of a disklike recording medium of claim 14, according to a recording and/or playback apparatus of a disklike recording medium of claim 15, the recording and/or playback means comprises a first frame portion formed with the table and a second frame portion formed with the chucking member, and one of the first and second frames is to be rotated toward the other of the first and second frames by the third cam groove. Therefore, when the cam body rotates, one of the first and second frames is rotated toward the other of the first and second frames by the third cam groove.

16. In the recording and/or playback apparatus of a disklike recording medium of claim 15, according to a recording and/or playback apparatus of a disklike recording medium of claim 16, the positioning means is moved by a locking lever (the reference sign 52 in the drawings), which limits the rotation of the receiving portion by engaging with the receiving portion, and the second cam groove, and comprises an operation slider (slider 59 in the drawings) that rotates the locking lever between a position, at which it engages with the receiving portion, and a cancel position, at which the engagement with the receiving portion is canceled. Therefore, it is possible to rotates the locking lever between the position, at which it engages with the receiving portion, and the cancel position, at which the engagement with the receiving portion is canceled, by the operation slider.

17. In the recording and/or playback apparatus of a disklike recording medium of claim 16, according to a recording and/or playback apparatus of a disklike recording medium of claim 17, the other of the first and second frame portions is to be rotated toward the one of the first and second frame portions by the operation slider. Therefore, it is possible to rotate the other claim portion toward the one frame portion by the operation slider.

18. In the recording and/or playback apparatus of a disklike recording medium of claim 17 a recording and/or playback apparatus of a disklike recording medium of claim 18 comprises a receiving portion in which a plurality of supporting portions supporting respective peripheral ends of a plurality of disklike recording media are formed in an annular form and in which an opening portion (a cutout 174 in the specification) is formed on the supporting portion; a recording and/or playback means for conducting a recording and/or playback of the disklike recording medium, the recording and/or playback means comprising a table that rotates the desired disklike recording medium loaded by at least the loading means, and a chucking member that chucks the desired disklike recording medium, together with the table; a loading means (a loading mechanism in the specification) that takes the desired disklike recording medium out of the receiving portion and loads the desired disklike recording medium onto the recording and/or playback means; a positioning means (a conveyance means in the specification) that rotates the receiving portion and makes the desired disklike recording medium and the loading means oppose to each other; and a driving means comprising a cam body (the reference sign 74 in the drawings) formed with a first cam groove (the reference sign 77 in the drawings) that drives the loading means, a second cam groove (the reference sign 75 in the drawings) that works the positioning means, and a third cam groove (the reference sign 152 in the drawings) for chucking of the desired disklike recording medium by the table and the chucking member. Therefore, it is possible to conduct the chucking of the loading means, the positioning means and the chucking member by driving the cam body by the driving means.

19. In the recording and/or playback apparatus of a disklike recording medium of claim 18, according to a recording and/or playback apparatus of a disklike recording medium of claim 19, the loading means comprises a holding portion (loading levers 92, 93 in the specification) that holds the desired disklike recording medium and conveys the held, desired disklike recording medium to the recording and/or playback means. Therefore, it is possible to provide a recording and/or playback apparatus of a disklike recording medium having both of an advantageous effect of a recording and/or playback apparatus of a disklike recording medium of claim 18 and an advantageous effect of a recording and/or playback apparatus of a disklike recording medium of claim 7.

20. In the recording and/or playback apparatus of a disklike recording medium of claim 19, according to a recording and/or playback apparatus of a disklike recording medium of claim 20, the holding portion is formed to be rotatable by the first cam groove, between a first position for holding the desired disklike recording medium and a second position for conveying the held, desired disklike recording medium to the recording and/or playback means. Therefore, it is possible to provide a recording and/or playback apparatus of a disklike recording medium having both of an advantageous effect of a recording and/or playback apparatus of a disklike recording medium of claim 19 and an advantageous effect of a recording and/or playback apparatus of a disklike recording medium of claim 8.

21. In the recording and/or playback apparatus of a disklike recording medium of claim 19, according to a recording and/or playback apparatus of a disklike recording medium of claim 21, the holding portion is formed with a distance expanding operation portion (the reference sign 5 in the drawings) that widens a distance between the desired disklike recording medium and another disklike recording medium received in the receiving portion. Therefore, it is possible to provide a recording and/or playback apparatus of a disklike recording medium having both of an advantageous effect of a recording and/or playback apparatus of a disklike recording medium of claim 19 and an advantageous effect of a recording and/or playback apparatus of a disklike recording medium of claim 8.

22. In the recording and/or playback apparatus of a disklike recording medium of claim 19, according to a recording and/or playback apparatus of a disklike recording medium of claim 22, the loading means comprises a holding operation mechanism (grooves for opening and closing operations 127 and others in the specification) that makes the holding portion hold the desired disklike recording medium and cancels the holding of the desired disklike recording medium after the disklike recording medium is conveyed to the recording and/or playback means. Therefore, it is possible to provide a recording and/or playback apparatus of a disklike recording medium having both of an advantageous effect of a recording and/or playback apparatus of a disklike recording medium of claim 19 and an advantageous effect of a recording and/or playback apparatus of a disklike recording medium of claim 10.

23. In the recording and/or playback apparatus of a disklike recording medium of claim 22, according to a recording and/or playback apparatus of a disklike recording medium of claim 23, the loading means comprises a retaining mechanism (a disk holding mechanism 7 in the specification) retaining the desired disklike recording medium which has been conveyed by the holding portion and of which holding by the holding portion has been canceled. Therefore, it is possible to provide a recording and/or playback apparatus of a disklike recording medium having both of an advantageous effect of a recording and/or playback apparatus of a disklike recording medium of claim 19 and an advantageous effect of a recording and/or playback apparatus of a disklike recording medium of claim 10.

24. In the recording and/or playback apparatus of a disklike recording medium of claim 23, according to a recording and/or playback apparatus of a disklike recording medium of claim 24, the holding mechanism comprises a retaining portion (supporting levers 132, 133 in the specification) that moves between a retaining position for retaining the desired disklike recording medium, of which holding by the holding portion has been canceled, and a non-retaining position at which it is separated from the disklike recording medium after the desired disklike recording medium has been installed on the recording and/or playback means. Therefore, it is possible to provide a recording and/or playback apparatus of a disklike recording medium having both of an advantageous effect of a recording and/or playback apparatus of a disklike recording medium of claim 23 and an advantageous effect of a recording and/or playback apparatus of a disklike recording medium of claim 12.

25. In the recording and/or playback apparatus of a disklike recording medium of claim 18, according to a recording and/or playback apparatus of a disklike recording medium of claim 25, the positioning means is moved by a locking lever (the reference sign 52 in the drawings), which limits the rotation of the receiving portion by engaging with the receiving portion, and the second cam groove, and comprises an operation slider (slider 59 in the drawings) that rotates the locking lever between a position, at which it engages with the receiving portion, and a cancel position, at which the engagement with the receiving portion is canceled. Therefore, it is possible to provide a recording and/or playback apparatus of a disklike recording medium having both of an advantageous effect of a recording and/or playback apparatus of a disklike recording medium of claim 23 and an advantageous effect of a recording and/or playback apparatus of a disklike recording medium of claim 12.

What is claimed is:

1. A recording and/or playback apparatus of a disklike recording medium, comprising:
   a receiving portion in which a plurality of supporting portions supporting respective peripheral ends of a plurality of disklike recording media are formed in an annular form and in which an opening portion is formed on the supporting portion;
   a recording and/or playback means for conducting recording and/or playback of the disklike recording media;
   an ejecting operation means that penetrates from the opening portion of the receiving portion and ejects a desired disklike recording medium from the plurality of disklike recording media, from the supporting portion, the ejecting operation means including an ejecting lever contacting an operating slider, the ejecting lever ejecting the disklike recording medium in response to a translational movement of the operating slider;

a loading means that takes out the desired disklike recording medium, which has been ejected from the supporting portion by the ejecting operation means, from the receiving portion and loads the desired disklike recording medium onto the recording and/or playback means; and a positioning means that rotates the receiving portion and makes the desired disklike recording medium and the loading means oppose to each other, wherein the recording and/or playback means comprises a table that rotates the desired disklike recording medium loaded by at least the loading means, and a chucking member that chucks the desired disklike recording medium, together with the table, and wherein the apparatus further comprises a cam body formed with a first cam groove that drives the loading means, a second cam groove that works the positioning means, and a third cam groove for chucking of the desired disklike recording medium by the table and the chucking member.

2. A recording and/or playback apparatus of a disklike recording medium according to claim 1, wherein the recording and/or playback means comprises a first frame portion formed with the table and a second frame portion formed with the chucking member, and one of the first and second frames is to be rotated toward the other of the first and second frames by the third cam groove.

3. A recording and/or playback apparatus of a disklike recording medium according to claim 2, wherein the positioning means is moved by a locking lever which limits the rotation of the receiving portion by engaging with the receiving portion, and the second cam groove, and comprises an operation slider that rotates the locking lever between a position, at which it engages with the receiving portion, and a cancel position, at which the engagement with the receiving portion is canceled.

4. A recording and/or playback apparatus of a disklike recording medium according to claim 3, wherein the other of the first and second frame portions is to be rotated toward the one of the first and second frame portions by the operation slider.

5. A recording and/or playback apparatus of a disklike recording medium, comprising:

a receiving portion in which a plurality of supporting portions supporting respective peripheral ends of a plurality of disklike recording media are formed in an annular form and in which an opening portion is formed on the supporting portion;

a recording and/or playback means for conducting a recording and/or playback of the disklike recording medium, the recording and/or playback means comprising a table that rotates the desired disklike recording medium loaded by at least the loading means, and a chucking member that chucks the desired disklike recording medium, together with the table;

a loading means that takes the desired disklike recording medium out of the receiving portion and loads the desired disklike recording medium onto the recording and/or playback means;

a positioning means that rotates the receiving portion and makes the desired disklike recording medium and the loading means oppose to each other; and a driving means comprising a cam body formed with a first cam groove that drives the loading means, a second cam groove that works the positioning means, and a third cam groove for chucking of the desired disklike recording medium by the table and the chucking member.

6. A recording and/or playback apparatus of a disklike recording medium according to claim 5, wherein the loading means comprises a holding portion that holds the desired disklike recording medium and conveys the held, desired disklike recording medium to the recording and/or playback means.

7. A recording and/or playback apparatus of a disklike recording medium according to claim 6, wherein the holding portion is formed to be rotatable by the first cam groove, between a first position for holding the desired disklike recording medium and a second position for conveying the held, desired disklike recording medium to the recording and/or playback means.

8. A recording and/or playback apparatus of a disklike recording medium according to claim 6, wherein the holding portion is formed with a distance expanding operation portion that widens a distance between the desired disklike recording medium and another disklike recording medium received in the receiving portion.

9. A recording and/or playback apparatus of a disklike recording medium according to claim 6, wherein the loading means comprises a holding operation mechanism that makes the holding portion hold the desired disklike recording medium and cancels the holding of the desired disklike recording medium after the disklike recording medium is conveyed to the recording and/or playback means.

10. A recoding and/or playback apparatus of a disklike recording medium according to claim 9, wherein the loading means comprises a retaining mechanism retaining the desired disklike recording medium which has been conveyed by the holding portion and of which holding by the holding portion has been canceled.

11. A recording and/or playback apparatus of a disklike recording medium according to claim 10, wherein the holding mechanism comprises a retaining portion that moves between a retaining position for retaining the desired disklike recording medium, of which holding by the holding portion has been canceled, and a non-retaining position at which it is separated from the disklike recording medium after the desired disklike recording medium has been installed on the recording and/or playback means.

12. A recording and/or playback apparatus of a disklike recording medium according to claim 5, wherein the positioning means is moved by a locking lever which limits the rotation of the receiving portion by engaging with the receiving portion, and the second cam groove, and comprises an operation slider that rotates the locking lever between a position, at which it engages with the receiving portion, and a cancel position, at which the engagement with the receiving portion is canceled.

* * * * *